(12) United States Patent
Ebata

(10) Patent No.: US 7,819,751 B2
(45) Date of Patent: Oct. 26, 2010

(54) TORQUE FLUCTUATION ABSORBING APPARATUS

(75) Inventor: Masaru Ebata, Chita (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 485 days.

(21) Appl. No.: 11/861,882

(22) Filed: Sep. 26, 2007

(65) Prior Publication Data
US 2008/0078646 A1    Apr. 3, 2008

(30) Foreign Application Priority Data
Sep. 29, 2006    (JP)  ............................. 2006-268098

(51) Int. Cl.
*F16F 15/129*    (2006.01)
(52) U.S. Cl. .................................................. 464/68.41
(58) Field of Classification Search ............. 464/68.41; 192/210.1, 213.12, 213.22, 214.1
See application file for complete search history.

(56) References Cited

U.S. PATENT DOCUMENTS 4,583,959 A * 4/1986 Yoneda .................... 464/68.41
4,697,682 A * 10/1987 Alas et al. ................ 464/68.41

FOREIGN PATENT DOCUMENTS

| EP | 0 529 669 B1 | 3/1993 |
| GB | 2 269 440 A | 2/1994 |
| WO | WO 2006/079306 A1 | 8/2006 |

* cited by examiner

*Primary Examiner*—Greg Binda
(74) *Attorney, Agent, or Firm*—Buchanan Ingersoll & Rooney PC

(57) ABSTRACT

A torque fluctuation absorbing apparatus includes a first component member, a second component member, a third component member being movable relative to at least either one of the first component member and the second component member, an elastic member biasing the third component member in a direction to contact either one of the first component member and the second component member, and a pressing generating mechanism for generating pressing force in an identical direction to the direction of the biasing force by the elastic member when the third component member moves relative to at least either one of the first component member and the second component member.

20 Claims, 16 Drawing Sheets

F I G. 10
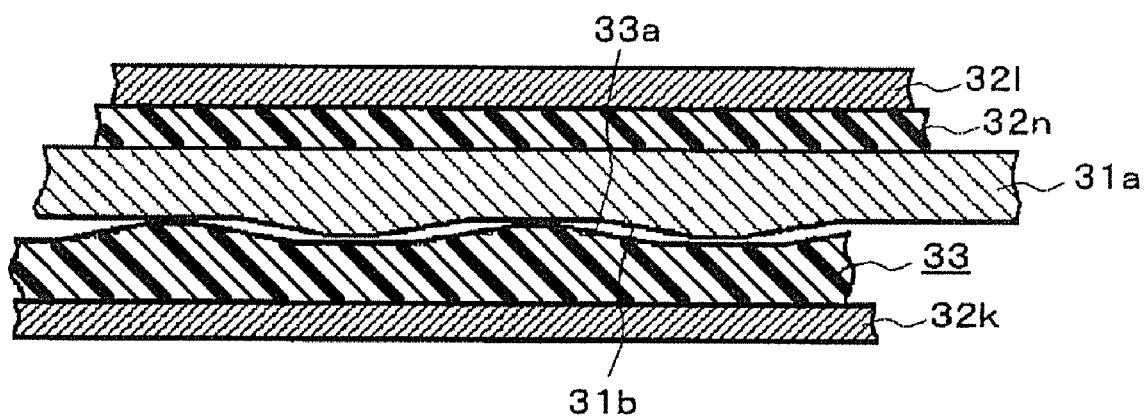

TORQUE FLUCTUATION ABSORBING APPARATUS

CROSS REFERENCE TO RELATED APPLICATIONS

This application is based on and claims priority under 35 U.S.C. §119 with respect to Japanese Patent Application No. 2006-268098 filed on Sep. 29, 2006, the entire content of which is incorporated herein by reference.

FIELD OF THE INVENTION

The present invention relates to a torque fluctuation absorbing apparatus.

BACKGROUND

A torque fluctuation absorbing apparatus is provided at an output shaft of an engine and/or an electric motor, for example, in a hybrid drive unit which includes the engine and the electric motor as a power source, and absorbs (restrains) fluctuation torque generated by the engine and the electric motor. A known torque fluctuation absorbing apparatus described in WO2006-079306A includes a second component member (i.e., indicated with reference number 3 in WO2006-079306A) having two surfaces (i.e., indicated with reference numbers 5, 6 in WO2006-079306A) which are provided having space from each other, and a first component member (i.e., indicated with reference number 2 in WO2006-079306A) and a third component member (i.e., indicated with reference number 8 in WO2006-079306A) are provided between the two surfaces. When the third component member (8) and the first component member (2) relatively move, a surface of the third component member (8) and a surface of the first component member (2) are configured to be pushed towards the respective surfaces (5, 6). The third component member (8) and the first component member (2) are provided with inclines (9, 10, 12, 13) so that the third component member (8) and the first component member (2) move relatively from each other having a predetermined play in a circumferential direction. The third component member (8) is arranged with no load applied in a radial direction and in an axial direction relative to the first component member (2) and the second component member (3).

In case level of inertia of the third component member (8) is small (e.g., when radius is small, or when large inertia is not achieved because of space), even when the third component member (8) is dragged by the first component member (2), adequate frictional torque may not be attained.

Further, because the third component member (8) moves freely in a radial direction and in an axial direction, rattling sound may be generated by a contact of the third component member to other components.

Further, because the third component member (8) moves in the axial direction, when the inclines of the first component member (2) and of the third component member (8) come in contact, instantaneously, the third component member (8) moves in a vertical direction relative to the inclines, which delays generations of the load in the axial direction, and thus hysteresis does not work quickly.

EP0529669B discloses a two-mass flywheel which generates hysteresis while constantly pressing a friction member by means of a coned disc spring. According to the constructions described in EP0529669B, the friction member extends in a radial direction, and protrusions which are in contact with a first component member (rivet) in predetermined intervals in a circumferential direction are provided. When the first component member and a second component member are twisted equal to or greater than a predetermined level of amplitude (i.e., rotational angle), upon a contact of the protrusions and the first component member, hysteresis starts being generated. With the foregoing structure in which hysteresis is varied based on changes of amplitude, when predetermined load of the coned disc spring is increased for the purpose of setting large degree of hysteresis properties by increasing frictional force, there is a possibility of generating big slapping sound by a contact of the friction member and the rivet when the hysteresis is generated. Further, when large degree of the hysteresis is set to be generated, because input of the torque fluctuation assumes relatively small, the friction member does not slide when the first component member and the second component member are twisted within slight amplitude, and thus vibrations at an engine side is not adequately absorbed.

A need thus exists for a torque fluctuation absorbing apparatus which is not susceptible to the drawback mentioned above.

SUMMARY OF THE INVENTION

In light of the foregoing, the present invention provides a torque fluctuation absorbing apparatus, which includes a first component member, a second component member, a third component member movable relative to the first component member and the second component member in a circumferential direction, an elastic member biasing the third component member in a direction to contact either one of the first component member and the second component member, and a pressing generating mechanism provided at the third component member for generating pressing force in an identical direction to the direction of the biasing force by the elastic member in response to relative speed and/or relative acceleration when the third component member moves relative to said one of the first component member and the second component member in the circumferential direction.

According to another aspect of the present invention, a torque fluctuation absorbing apparatus includes a first component member provided between two surfaces, a second component member having said two surfaces arranged spaced from each other, a third component member arranged between said two surfaces and being movable relative to either one of the first component member and the second component member having a predetermined play in a circumferential direction, an elastic member biasing the third component member in a direction to contact said one of the first component member and the second component member, and a pressing generating mechanism provided at the third component member for generating pressing force in an identical direction to the direction of the biasing force by the elastic member in response to relative speed and/or relative acceleration when the third component member moves relative to said one of the first component member and the second component member in the circumferential direction.

According to further aspect of the present invention, a torque fluctuation absorbing apparatus includes a first component member, a second component member, a third component member being movable relative to either one of the first component member and the second component member, an elastic member biasing the third component member in a direction to contact said one of the first component member and the second component member, and a pressing generating mechanism provided at the third component member for generating pressing force in an identical direction to the direction of the biasing force by the elastic member when the third component member moves relative to said one of the first component member and the second component member.

BRIEF DESCRIPTION OF THE DRAWINGS

The foregoing and additional features and characteristics of the present invention will become more apparent from the following detailed description considered with reference to the accompanying drawings, wherein:

FIG. 10 is a partial cross-sectional view of the torque fluctuation absorbing apparatus taken on line X-X in FIG. 9 according to the fourth embodiment of the present invention.

DETAILED DESCRIPTION

Figure 1:
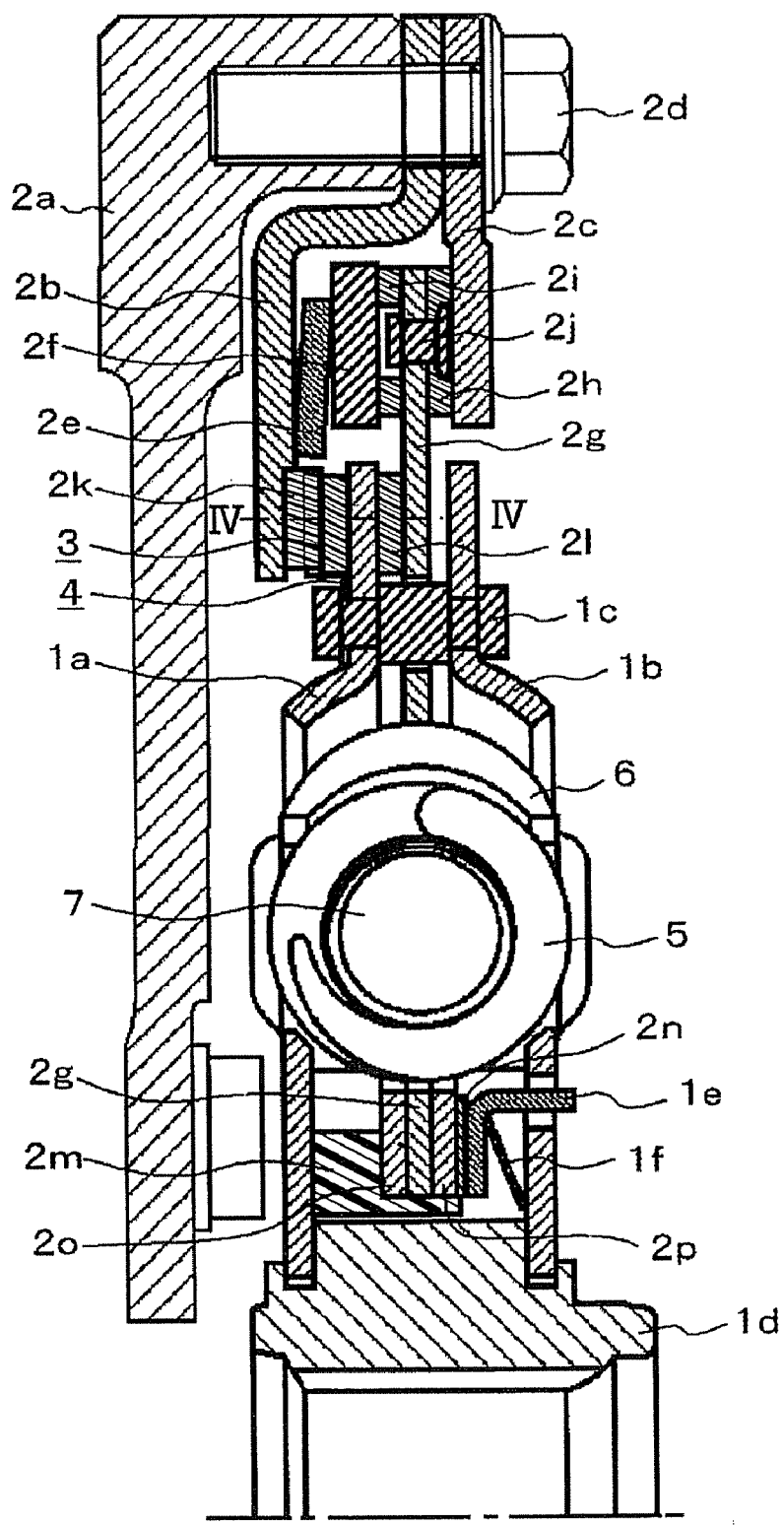
FIG. 1 is a schematically shown partial cross-sectional view of a torque fluctuation absorbing apparatus taken on line I-I in FIG. 2 according to a first embodiment of the present invention.

Embodiments of the present invention will be explained with reference to illustrations of drawing figures as follows.

A torque fluctuation absorbing apparatus according to the first embodiment, for example, is provided at an output shaft of an engine in a hybrid drive unit for absorbing (restraining) a fluctuation torque generated by the engine and an electric motor. The torque fluctuation absorbing apparatus having a torsional damping friction includes a first component member 1 ($1a$-$1f$), a second component member 2 ($2a$-$2q$), a third component member 3, an elastic member 4, a coil spring 5, a seat member 6, and an elastic member 7.

A portion of the first component member 1 is provided between two surfaces (i.e., surfaces of a plate $2b$ and an intermediate plate $2g$) of the second component member 2. A disc plate $1a$ is an annular plate member which is formed in a predetermined configuration. The disc plate $1a$ is fixed to a hub member $1d$ at a radially inner end portion thereof. The disc plate $1a$ is slidably in contact with a friction member $2m$ in the vicinity of the radially inner end portion thereof. The disc plate $1a$ includes a window portion formed at an intermediate portion thereof for housing the coil spring 5, the seat member 6, and the elastic member 7. End surfaces of the window portion in a peripheral direction are detachably in contact with the seat member 6. The disc plate $1a$ is fixed to a rivet $1c$ at a radially outer side relative to the coil spring 5. The disc plate $1a$ is arranged between the third component member 3 and a friction member $2l$ in the vicinity of outer end of the disc plate $1a$ in a radial direction so as to slide with the third component member 3 and the friction member $2l$.

A disc plate $1b$ is an annular plate member formed in a predetermined configuration. The disc plate $1b$ is fixed to the hub member $1d$ at a radially inner peripheral end portion thereof. The disc plate $1b$ is in contact with an end of a coned disc spring $1f$ at radially inner side portion thereof. The disc plate $1b$ includes a hole formed in the vicinity of a portion which is in contact with the coned disc spring $1f$ for restraining movement of a plate $1e$ in a rotational direction and in a radial direction and for allowing movement of the plate $1e$ in an axial direction. The disc plate $1b$ includes a window portion for housing the coil sprig 5, the seat member 6, and the elastic member 7 so that end surfaces of the window portion are detachably in contact with the seat member 6. The disc plate $1b$ is fixed to the rivet $1c$ at the radially outer periphery side relative to the coil spring 5.

The rivet $1c$ integrally fixes the disc plate $1a$, the disc plate $1b$, and the elastic member 4. The disc plate $1a$ and the elastic member 4 are fixed by the rivet $1c$ by caulking at a rotational member $2a$ side. The disc plate $1b$ is fixed by the rivet $1c$ by caulking at the opposite side from the rotational member $2a$. The rivet $1c$ includes a larger diameter intermediate portion which is not fixed to the intermediate plate $2g$ so as to be movable within the window portion formed at the intermediate plate $2g$.

A radially inner periphery of the hub member $1d$ is engaged with a rotational shaft of the electric motor by means of a spline. The hub member $1d$ fixes the disc plate $1a$ and the disc plate $1b$ at the radially outer portion thereof.

The plate $1e$ is arranged between the disc plate $1b$ and a friction member $2n$ and is biased towards the friction member $2n$ by means of the coned disc spring $1f$. The movement of the disc plate $1e$ in the rotational direction and in the radial direction is limited by the hole formed on the disc plate $1b$, and the disc plate $1e$ is movable in the axial direction.

The coned disc spring $1f$ is arranged between the disc plate $1b$ and the plate $1e$ so as to bias the plate $1e$ towards the friction member $2n$.

The second component member 2 includes two surfaces (i.e., the surfaces of the plate $2b$ and the intermediate plate $2g$) which are arranged spaced from each other. The second component member 2 includes the rotational member 2a, the plate 2b, a plate 2c, a bolt 2d, a coned disc spring 2e, a plate 2f, the intermediate plate 2g, friction members 2h, 2i, a rivet 2j, friction members 2k, 2l, 2m, 2n, auxiliary plates 2o, 2p, and a rivet 2q.

The rotational member 2a is an annular rotational member which is fixed to, for example, a rotational shaft of the engine by a bolt. The rotational member 2a includes a screw hole formed in an axial direction to be threaded onto the bolt 2d at a portion in the vicinity of the radially outer side thereof. The rotational member 2a is in contact with the plate 2b.

The plate 2b is an annular plate member which is formed in a predetermined configuration. The plate 2b is arranged between the rotational member 2a and the plate 2c at a portion in the vicinity of the radially outer side thereof, and is fixed to the rotational member 2a together with the plate 2c by means of the bolt 2d. The plate 2b is separated from the plate 2c at radially inner side thereof. The friction member 2k is adhered to a surface of the plate 2b facing the plate 2c at radially inner side of the plate 2b. The plate 2b is in contact with an end of the coned disc spring 2e at the surface facing the plate 2c.

The plate 2c is an annular plate member formed in a predetermined configuration. The plate 2c is provided between the plate 2b and a flange portion of the bolt 2d at the radially outer side thereof, and is fixed to the rotational member 2a together with the plate 2b by means of the bolt 2d. The plate 2c is separated from the plate 2b at a radially inner side thereof. The plate 2c is in contact with the friction member 2h at a radially inner side thereof.

The bolt 2d is a member to fix the plate 2b and the plate 2c to the rotational member 2a, and is inserted through holes formed on the plates 2b and the plates 2c so as to be threaded onto the rotational member 2a.

The coned disc spring 2e is provided between the plate 2b and the plate 2f so as to bias the plate 2f towards the friction member 2i.

The plate 2f is provided between the coned disc spring 2e and the friction member 2i so as to be biased towards the friction member 2i by means of the coned disc spring 2e.

The intermediate plate 2g is a plate member provided between the disc plate 1a and the disc plate 1b without being in contact with the disc plate 1a and the disc plate 1b. The intermediate plate 2g is configured to be relatively movable to the disc plate 1a and the disc plate 1b. The auxiliary plates 2o, 2p are fixed to the respective surfaces of the intermediate plate 2g at radially inner side portion by means of the rivet 2q (See FIG. 2). The intermediate plate 2g includes a window portion for housing the coil spring 5, the seat member 6, and the elastic member 7. End surfaces of the window portion of the intermediate plate 2g is detachably in contact with the seat member 6. The intermediate plate 2g includes another window portion which is not fixed by the rivet 1c so as to allow the movement of the rivet 1c in a rotational direction. The intermediate plate 2g is slidably in contact with the friction member 2l at the surface facing the disc plate 1a. A radially outer portion of the intermediate plate 2g extends between the plate 2c and the plate 2f, and the friction members 2h, 2i are fixed to the respective surfaces of the radially outer portion via the rivet 2j.

The friction member 2h is arranged between the intermediate plate 2g and the plate 2c, and is fixed to the intermediate plate 2g by means of the rivet 2j. The friction member 2h is slidably in contact with the plate 2c.

Figure 2:
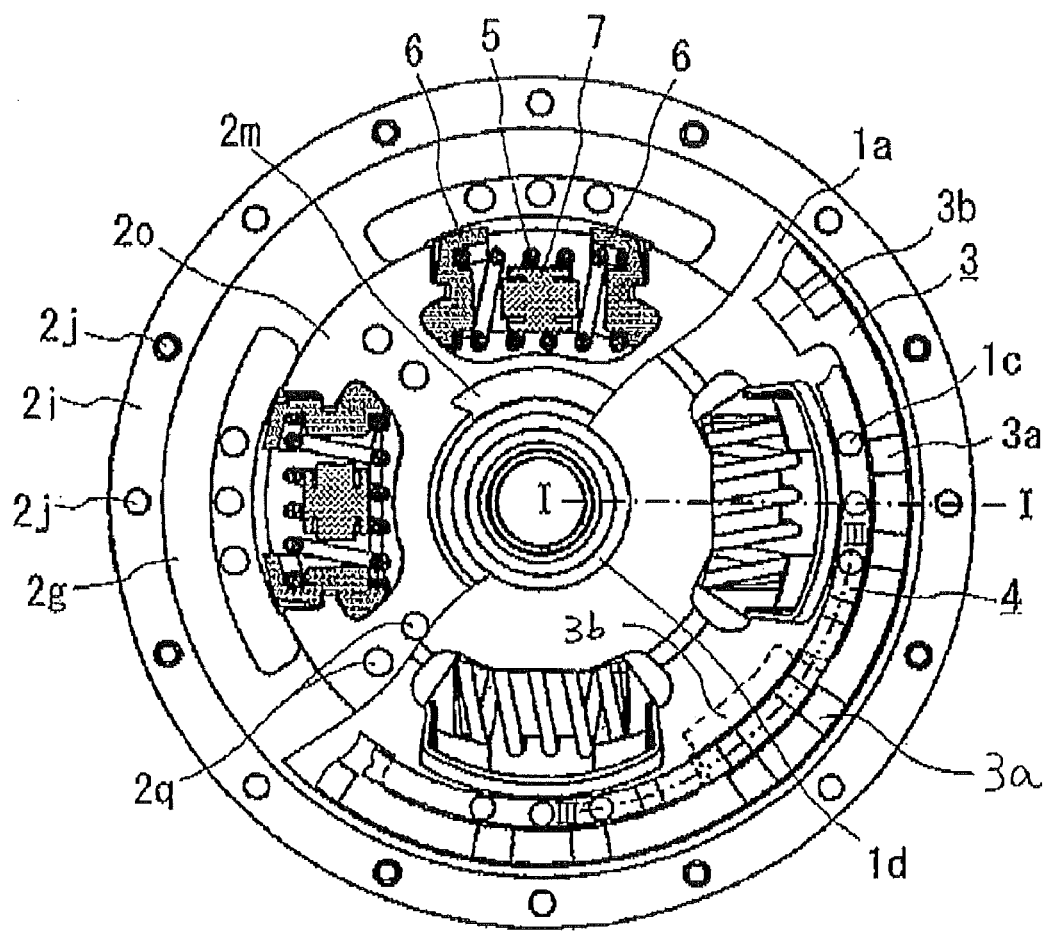
FIG. 2 is a partially notched plane view of the torque fluctuation absorbing apparatus according to the first embodiment of the present invention.

The friction member 2i is arranged between the intermediate plate 2g and the plate 2f, and is fixed to the intermediate plate 2g by means of the rivet 2j (See FIG. 2). The friction member 2i is slidably in contact with the plate 2f.

The rivet 2j is a member to fix the friction member 2i and/or the friction member 2h to the intermediate plate 2g.

Figure 4:
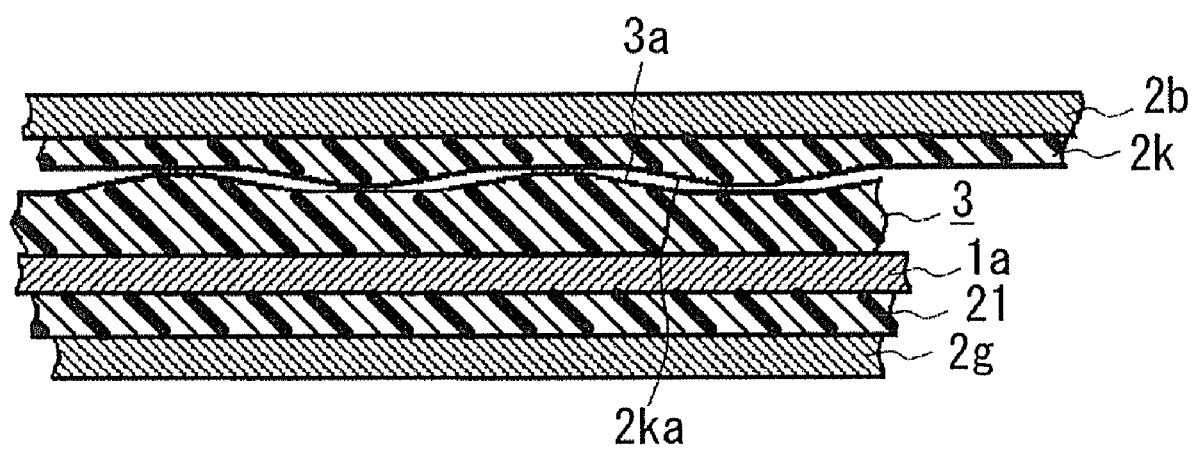
FIG. 4 is a partial cross-sectional view of the torque fluctuation absorbing apparatus taken on line IV-IV in FIG. 1 according to the first embodiment of the present invention.

The friction member 2k is provided between the plate 2b and the third component member 3 and is fixed to the plate 2b. The friction member 2k includes a tapered surface (i.e., serving as a second tapered surface) 2ka (See FIG. 4) facing the third component member 3. The tapered surface 2ka faces a tapered surface 3a (i.e., serving as a first tapered surface) (See FIG. 4) of the third component member 3, and the tapered surface 2ka and the tapered surface 3a are relatively movable having a predetermined play in a circumferential direction. Upon a contact of the tapered surface 3a, the tapered surface 2ka pushes the third component member 3 towards the disc plate 1a in response to the relative speed and/or the relative acceleration.

The friction member 2l is arranged between the disc plate 1a and the intermediate plate 2g, and is detachably and slidably in contact with the disc plate 1a and the intermediate plate 2g. The friction member 2l is configured to be separated from the intermediate plate 2g when the third component member 3 does not push the disc plate 1a.

The friction member 2m is arranged between the disc plate 1a and the auxiliary plate 2o, and is slidably in contact with the disc plate 1a and the auxiliary plate 2o. A radially inner side portion of the friction member 2 in extends to a portion between the hub member 1d and the auxiliary plate 2o, intermediate plate 2g and the auxiliary plate 2p. The friction member 2n is arranged between the auxiliary plate 2p and the plate 1e, and is slidably in contact with the auxiliary plate 2p and the plate 1e.

The auxiliary plate 2o is a plate which is fixed to the intermediate plate 2g at the surface facing the disc plate 1a by means of the rivet 2q (See FIG. 2). The auxiliary plate 2o includes a window portion for housing the coil spring 5, the seat member 6, and the elastic member 7, and end surfaces of the window portion is detachably in contact with the seat member 6. The auxiliary plate 2o is slidably in contact with the friction member 2m at a radially inner portion thereof.

The auxiliary plate 2p is a plate which is fixed to the intermediate plate 2g at the surface facing the disc plate 1b by means of the rivet 2q. The auxiliary plate 2p includes a window portion for housing the coil spring 5, the seat member 6, and the elastic member 7, and end surfaces of the window portion is detachably in contact with the seat member 6. The auxiliary plate 2p is slidably in contact with the friction member 2n at a radially inner portion thereof.

The rivet 2q fixes the auxiliary plates 2o, 2q to the intermediate plate 2g.

The third component member 3 includes a friction member provided between two surfaces (i.e., the surfaces of the plate 2b and the intermediate plate 2g) of the second component member 2. The third component member 3 is provided radially outward relative to the coil spring 5, and is arranged between the friction member 2k of the second component member 2 and the disc plate 1a of the first component member 1. The third component member 3 includes the tapered surface 3a (see FIG. 4) facing the friction member 2k. The tapered surface 3a faces the tapered surface 2ka (see FIG. 4) of the friction member 2k, the tapered surface 3a and the tapered surface 2ka are relatively movable having the predetermined play from each other in the circumferential direction. The tapered surface 3a serves as a pressing generating mechanism which is configured to be pushed towards the disc plate 1a upon a contact of the tapered surface 3a to the tapered surface 2ka in response to the relative speed and/or the relative acceleration. The third component member 3 includes extended portions 3b formed at radially inner side thereof for receiving the biasing force of the elastic member 4 so that the third component member 3 is biased towards the disc plate 1a by means of the elastic member 4 (see FIGS. 2, 3). The third component member 3 is slidably in contact with the disc plate 1a.

Figure 3:
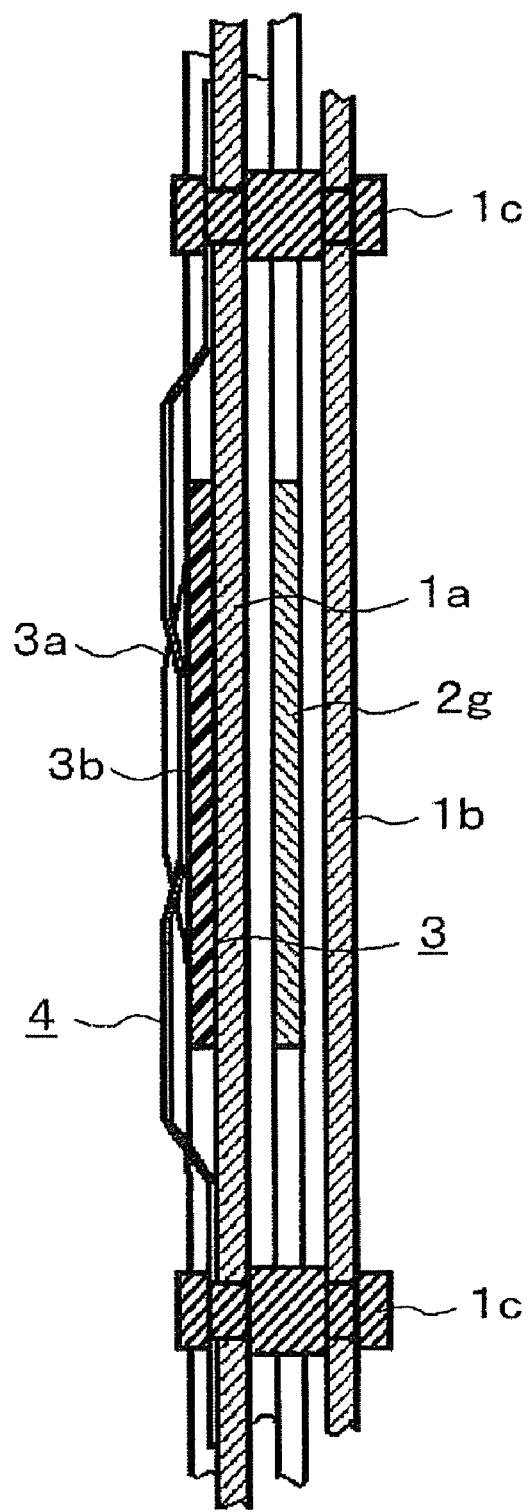
FIG. 3 is a partial cross-sectional view of the torque fluctuation absorbing apparatus taken on line III-III in FIG. 2 according to the first embodiment of the present invention.

The elastic member 4 is a waved spring shaped in a ring, and is fixed to a surface of the disc plate 1a of the first component member 1 facing the rotational member 2a by means of the rivet 1c (see FIGS. 2, 3). The elastic member 4 biases the extended portion 3b of the third component member 3 towards to the disc plate 1a.

The coil spring 5 is housed in the window portion formed at the disc plates 1a, 1b, the intermediate plate 2g, and the auxiliary plates 2o, 2p, and is in contact with the seat member 6 which is arranged at both ends thereof (see FIG. 2). The coil spring 5 is deflected when the disc plates 1a, 1b and the intermediate plate 2g relatively move so as to absorb shock and noise caused by rotational difference between the disc plates 1a, 1b and the intermediate member 2g (i.e., caused when the disc plates 1a, 1b and the intermediate member 2g is twisted relatively quickly).

The seat member 6 is housed in the window portion formed on the disc plates 1a, 1b, the intermediate plate 2g, and the auxiliary plates 2o, 2p, and is arranged between the window portion and end portions of the coil spring 5.

The elastic member 7 is arranged at an internal peripheral side of the coil spring 5, comes in contact with two seat members 6 facing each other when the coil spring 5 is deflected, and absorbs a shock generated by the rotational difference of the disc plates 1a, 1b and the intermediate plate 2g.

According to the construction of the first embodiment of the present invention, hysteresis varied based on amplitude with a level which does not affect in the vehicle travel (i.e., in the slightly amplitude condition) is predetermined, and necessary hysteresis is generated by hysteresis which varies in response to the relative speed and/or the relative acceleration when the first component member and the second component member move greatly, for example, at engine start, acceleration, deceleration, or the like. Further, by eliminating a gap between the third component member 3 and the disc plate 1a in an axial direction by means of the elastic member 4, generation of slapping sound is prevented. Further, according to the foregoing construction, because load can be applied in the axial direction instantly upon a contact of the tapered surface 3a of the third component member 3 and the tapered surface 2ka of the friction member 2k of the second component member 2, load in the axial direction generated by relative speed and/or relative acceleration is efficiently increased. The foregoing construction according to the first embodiment enables to strike a balance between a performance when the first component member and the second component member move slightly and a performance when the first component member and the second component member move greatly. Because necessary hysteresis is obtained even when hysteresis which varies in response to relative speed and/or relative acceleration is small by combining with the structure generating the hysteresis varied based on the amplitude, the hysteresis is set to be generated with less space. Further, by determining coefficient of friction of the friction member 2l to be less than coefficient of friction of the third component member 3 which function as a pair for hysteresis (i.e., by determining coefficient of friction between the first component member 1 and . the second component member 2 to be less than coefficient of friction between the third component member 3 and the second component member 2), interference hysteresis when the first component member and the second component member move slightly within a range where hysteresis varied based on amplitude is not generated but is restrained.

On one hand, the structure generating the hysteresis varied based on the amplitude, may influence damping performance when the first component member and the second component member move slightly and generate slapping sound when the structure for generating hysteresis varied based on the amplitude is operated. On the other hand, with the structure generating hysteresis which varies in response to relative speed and/or relative acceleration, adequate hysteresis may be not generated when inertia of the third component member 3 is small. However, according to the embodiment of the present invention, to combine the both structures for generating hysteresis varied based on the amplitude and for generating hysteresis varied in response to relative speed and/or relative acceleration compensates each other.

Figure 5:
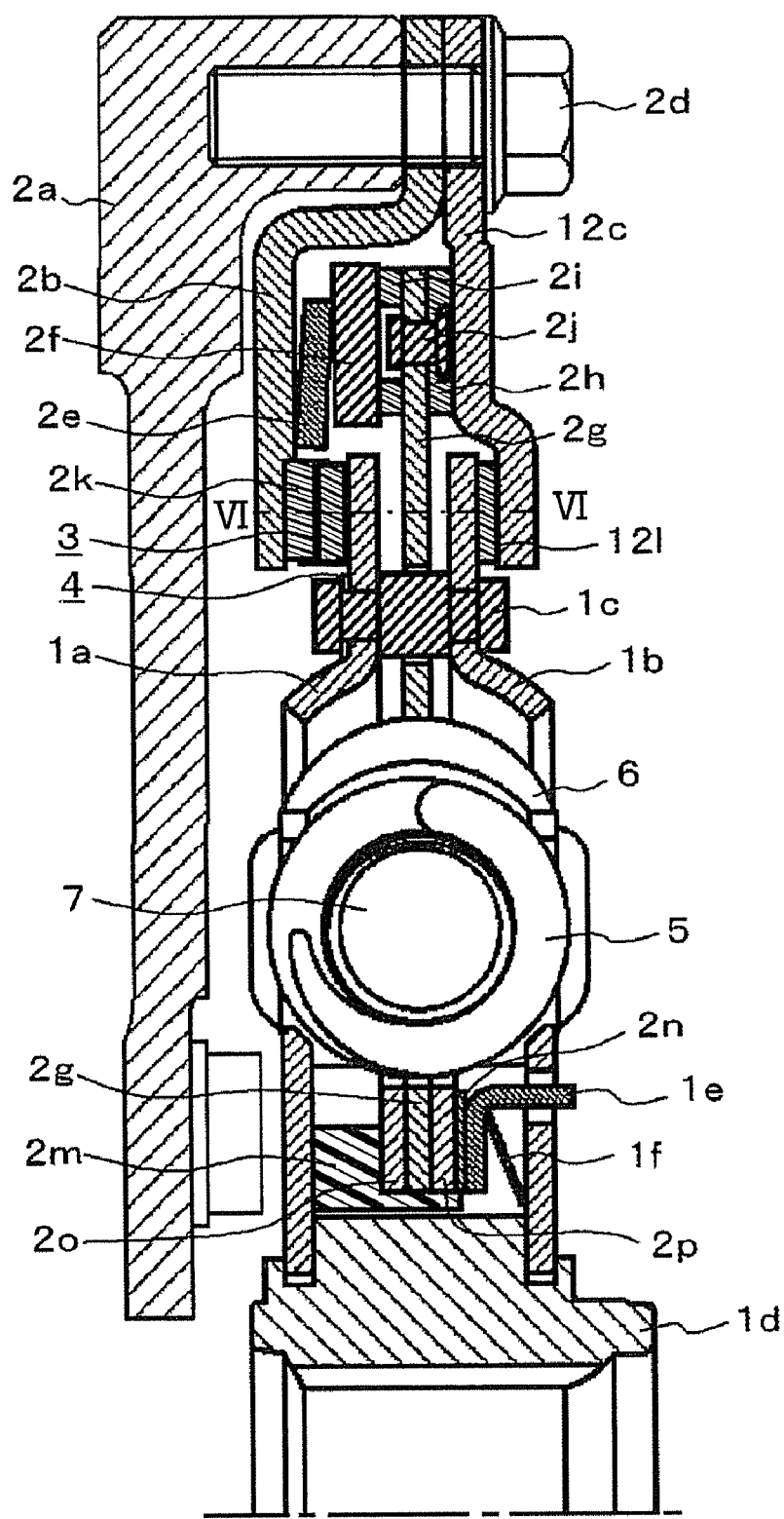
FIG. 5 is a partial cross-sectional view of a torque fluctuation absorbing apparatus according to a second embodiment of the present invention.
Figure 6:
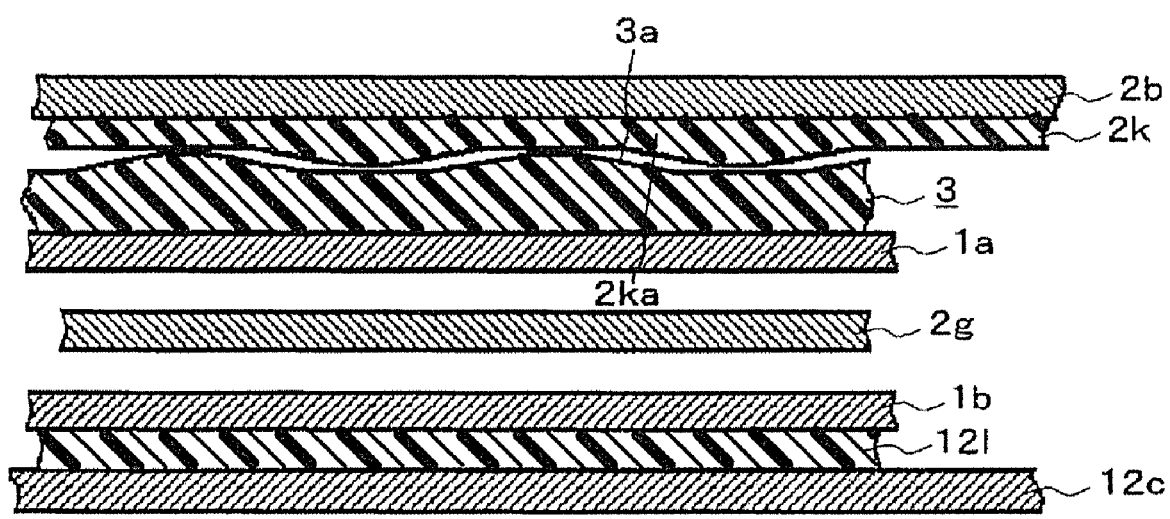
FIG. 6 is a partial cross-sectional view of the torque fluctuation absorbing apparatus taken on line VI-VI in FIG. 5 according to a second embodiment of the present invention.

A second embodiment will be explained with reference to FIGS. 5-6 as follows. As shown in FIGS. 5-6, according to a torque fluctuation absorbing apparatus of the second embodiment, the friction member 2l of the first embodiment is omitted and a hysteresis structure is constructed at a portion which is not affected by abrasion loss of a limiter member. Namely, a plate 12c which corresponds to the plate 2c of the first embodiment is arranged to extend to overlap with an outer side of the disc plate 1b, and a friction member 12l is provided between the plate 12c and the disc plate 1b. Other constructions of the second embodiment is identical to the first embodiment, and explanations will not be repeated.

According to the second embodiment, advantages likewise the first embodiment are attained.

Figure 7:
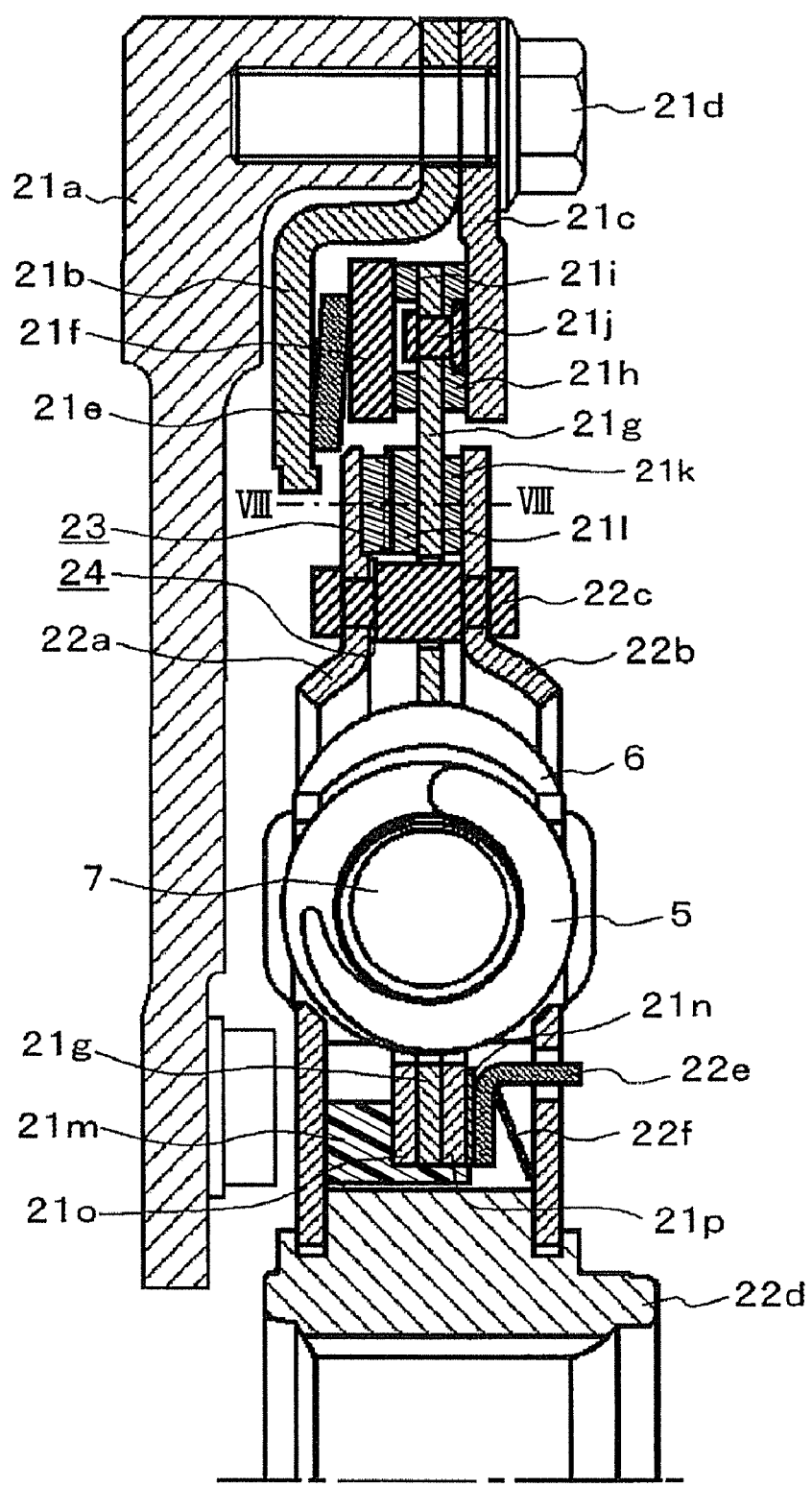
FIG. 7 is a partial cross-sectional view of a torque fluctuation absorbing apparatus according to a third embodiment of the present invention.
Figure 8:
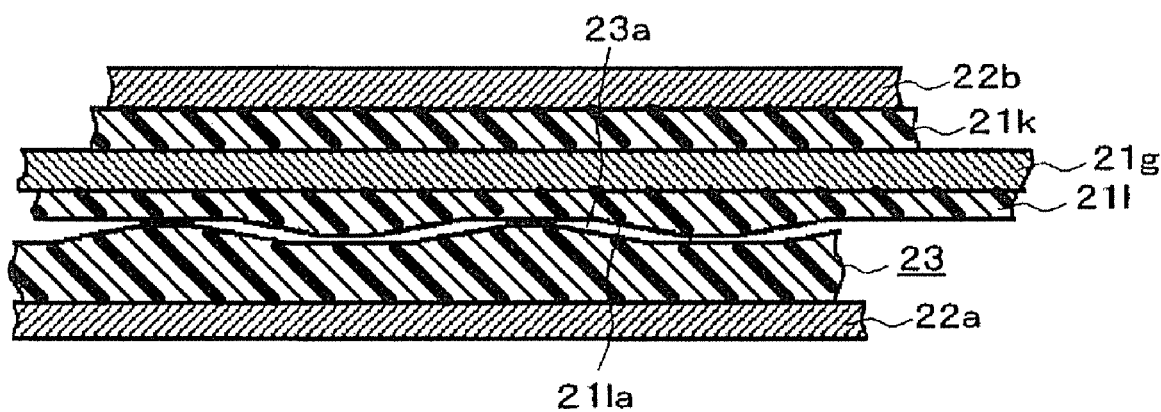
FIG. 8 is a partial cross-sectional view of the torque fluctuation absorbing apparatus taken on line VIII-VIII in FIG. 7 according to the third embodiment of the present invention.

A third embodiment of a torque fluctuation absorbing apparatus will be explained referring to FIGS. 7-8 as follows.

The torque fluctuation absorbing apparatus according to the third embodiment is applied, for example, on an output shaft of an engine at a hybrid drive unit, and absorbs (restrains) fluctuation torque generated by the engine and an electric motor. The torque fluctuation absorbing apparatus having a torsional damping friction includes a first component member 21 (21a-21p), a second component member 22 (22a-22f), a third component member 23, an elastic member 24, the coil spring 5, the seat member 6, and the elastic member 7.

A part of the first component member 21 is arranged between two surfaces (i.e., surfaces of a disc plate 22a and a disc plate 22b) of the second component member 22. The first component member 21 includes a rotational member 21a, plates 21b, 21c, a bolt 21d, a coned disc spring 21e, a plate 21f, an intermediate plate 21g, friction members 21h, 21i, a rivet 21j, friction members 21k, 21l, 21m, 21n, and auxiliary plates 21o, 21p. Constructions of the parts other than the plate 21b, the friction member 21l and the friction member 21k are identical to the constructions of the rotational member 2a, the plate 2c, the bolt 2d, the coned disc spring 2e, the plate 2f, the intermediate plate 2g, the friction members 2h, 2i, the rivet 2j, the friction members 2m, 2n, and the auxiliary plates 2o, 2p of the first embodiment.

The plate 21b is an annular plate member formed in a predetermined configuration. The plate 21b is arranged between the rotational member 21a and the plate 21c and fixed to the rotational member 21a together with the plate 21c at radially outer portion. The plate 21b is separated from the plate 21c at radially inner side thereof. The plate 21b is in contact with an end of the coned disc spring 21e at the surface facing the plate 21c. The plate 21b is not provided with a friction member, unlike the first embodiment, at the surface facing the plate 21c at radially inner side portion.

The friction member 21*l* is provided between the intermediate plate 21*g* and the third component member 23 and fixed to the intermediate plate 21*g*. The friction member 21*l* includes a tapered surface (i.e., serving as a second tapered surface) 21*la* (see FIG. 8) at a surface facing the third component member 23. The tapered surface 21*la* faces a tapered surface 23*a* (i.e., serving as a first tapered surface) (see FIG. 8) of the third component member 23, the tapered surface 21*la* and the tapered surface 23*a* are relatively movable having a predetermined play in a circumferential direction, and the tapered surface 21*la* is configured to push the third component member 23 towards the disc plate 22*a* upon a contact with the tapered surface 23*a* in response to relative speed and/or relative acceleration.

The friction member 21*k* is arranged between the intermediate plate 21*g* and the disc plate 22*b*, and is slidably in contact with the intermediate plate 21*g* and the disc plate 22*b*.

The second component member 22 includes two surfaces (i.e., surfaces of the disc plate 22*a* and the disc late 22*b*) which are arranged spaced from each other. The second component member 22 includes the disc plates 22*a*, 22*b*, a rivet 22*c*, a hub member 22*d*, a plate 22*e*, and a coned disc spring 22*f*. Constructions of parts other than the disc plate 22*a* are identical to the disc plate 1*b*, the rivet 1*c*, the hub member 1*d*, the plate 1*e*, and the coned disc spring 1*f* of the first embodiment.

The disc plate 22*a* is an annular plate member formed in a predetermined configuration. The disc plate 22*a* is fixed to the hub member 22*d* at a radially inner end portion thereof. The disc plate 22*a* is slidably in contact with the friction member 21*m* at a radially inner side portion. The disc plate 22*a* includes a window portion which houses the coil spring 5, the seat member 6, and the elastic member 7, and end surfaces of the window portion in a circumferential direction are detachably in contact with the seat member 6. The disc plate 22*a* is fixed to the rivet 22*c* at radially outer side relative to the coil spring 5. The disc plate 22*a* is slidably in contact with the third component member 23 at a surface facing the disc plate 22*b* at radially outer portion thereof.

The third component member 23 is a friction member provided between two surfaces (i.e., surfaces of the disc plate 22*a* and the disc plate 22*b*) of the second component member 22. The third component member 23 is arranged radially outer side relative to the coil spring 5, and is arranged between the friction member 21*l* of the first component member 21 and the disc plate 22*a* of the second component member 22. The third component member 23 includes a tapered surface 23*a* (see FIG. 8) at a surface facing the friction member 21*l*. The tapered surface 23*a* faces the tapered surface 21*la* (see FIG. 8) of the friction member 21*l*, relatively movable having a predetermined play in a circumferential direction from the tapered surface 21*la*, and is configured to be pushed towards the disc plate 22*a* in response to the relative speed and/or the relative acceleration upon a contact with the tapered surface 21*la*. The third component member 23 includes an extension portion which receives a biasing force of the elastic member 24 at radially inner side thereof, and is biased towards the disc plate 22*a* by the elastic member 24. The third component member 23 is slidably in contact with the disc plate 22*a*.

The elastic member 24 is a ring shaped waved spring, and is fixed to the disc plate 22*a* of the second component member 22 at a surface facing the intermediate plate 21*g* via the rivet 22*c*. The elastic member 24 biases the third component member 23 towards the disc late 22*a*.

According to the constructions of the third embodiment, the advantages identical to the first embodiment are attained.

Figure 9:
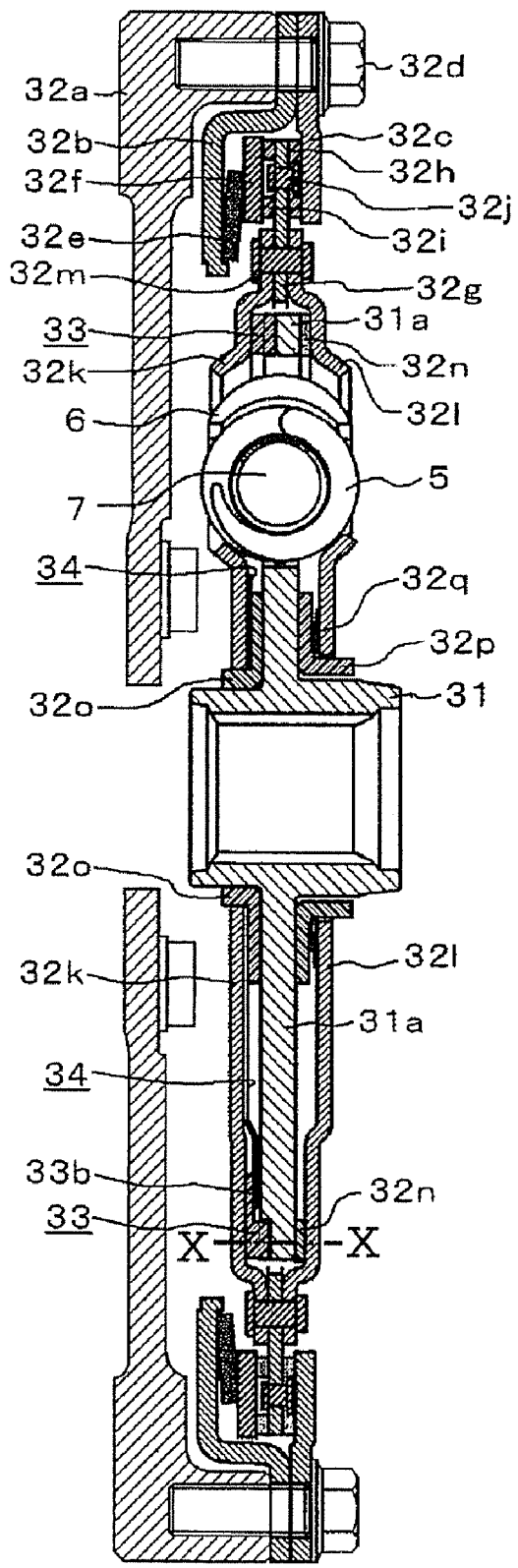
FIG. 9 is a partial cross-sectional view of a torque fluctuation absorbing apparatus according to a fourth embodiment of the present invention.

A fourth embodiment of a torque fluctuation absorbing apparatus will be explained with reference to FIGS. 9-10 as follows.

The torque fluctuation absorbing apparatus according to the fourth embodiment is, for example, provided at an output shaft of an engine in a hybrid drive unit for absorbing (restraining) fluctuated torque by the engine and an electric motor. The torque fluctuation absorbing apparatus having a torsional damping friction includes a first component member 31, a second component member 32 (32*a*-32*q*), a third component member 33, an elastic member 34, the coil spring 5, the seat member 6, and the elastic member 7.

The first component member 31 is provided between two surfaces (i.e., surfaces of a disc plate 32*k* and a disc plate 32*l*) of the second component member 32. The first component member 31 is a hub member, and has a spline-engagement with, for example, a rotational shaft of the electric motor at radially inner side thereof. The first component member 31 includes a flange portion 31*a* which extends radially outward thereof. The flange portion 31*a* includes a window portion at an intermediate portion thereof for housing the coil spring 5, the seat member 6, and the elastic member 7. End surfaces of the window portion in a circumferential direction is detachably in contact with the seat member 6. The flange portion 31*a* includes a tapered surface (i.e., serving as a second tapered surface) 31*b* (See FIG. 10) formed at a surface facing the disc plate 32*k* in the vicinity of the outer periphery of the flange portion 31*a*. The tapered surface 31*b* faces a tapered surface 33*a* (i.e., serving as a first tapered surface) (See FIG. 10) formed on the third component member 33, is relatively movable to the tapered surface 33*a* in a circumferential direction having a predetermined play from each other, and is configured to push the third component member 33 towards the disc plate 32*k* in response to the relative speed and/or the relative acceleration upon a contact to the tapered surface 33*a*.

The second component member 32 includes two surfaces (i.e., surfaces of the disc plate 32*k* and the disc plate 32*l*) which are provided having a distance therebetween. The second component member 32 includes a rotational member 32*a*, plates 32*b*, 32*c*, a bolt 32*d*, a coned disc spring 32*e*, a plate 32*f*, an intermediate plate 32*g*, friction members 32*h*, 32*i*, a rivet 32*j*, disc plates 32*k*, 32*l*, a rivet 32*m*, friction members 32*n*, 32*o*, 32*p*, and a coned disc spring 32*q*.

The rotational member 32*a* is an annular rotational member which is fixed, for example, to a rotational shaft of an engine by means of a bolt. The rotational member 32*a* includes a hole or a groove which is threaded to the bolt 32*d*. The rotational member 32*a* is in contact with the plate 32*b*.

The plate 32*b* is an annular plate member formed in a predetermined configuration. The plate 32*b* is provided between the rotational member 32*a* and the plate 32*c* and is fixed to the rotational member 32*a* together with the plate 32*c* by means of the bolt 32*d* at radially outer peripheral portion thereof. The plate 32*b* is separated from the plate 32*c* at a radially inner side portion thereof. The plate 32*b* is in contact with an end of the coned disc spring 32*e* at a surface facing the plate 32*c* thereof.

The plate 32*c* is an annular plate shaped in a predetermined configuration. The plate 32*c* is provided between the plate 32*b* and a flange portion of the bolt 32*d*, and is fixed to the rotational member 32*a* together with the plate 32*b* by means of the bolt 32*d* at radially outer side portion thereof. The plate 32*c* is separated from the plate 32*b* at radially inner side portion thereof. The plate 32*c* is in contact with the friction member 32*h* at radially inner side portion thereof.

The bolt 32*d* for fixing the plate 32*b* and the plate 32*c* to the rotational member 32*a* is provided through holes formed on the plate 32*b* and the plate 32*c* to be threaded to the rotational member 32*a*.

The coned disc spring 32*e* is provided between the plate 32*b* and the plate 32*f* to bias the plate 32*f* towards the friction member 32*l*.

The plate 32*f* is provided between the coned disc spring 32*e* and the friction member 32*l* to be biased towards the friction member 32*l* by means of the coned disc spring 32*e*.

The intermediate plate 32*g* is an annular plate member which is provided between the disc plate 32*k* and the disc plate 32*l* and fixed together with the disc plate 32*k* and the disc plate 32*l* by means of the rivet 32*m*. A radially outward portion of the intermediate plate 32*g* extends to be between the plate 32*c* and the plate 32*f*, and the friction members 32*h*, 32*i* are fixed to respective surfaces of the radially outward portion of the intermediate plate 32*g* by means of the rivet 32*j*.

The friction member 32*h* is provided between the intermediate plate 32*g* and the plate 32*c*, and is fixed to the intermediate plate 32*g* by means of the rivet 32*j*. The friction member 32*h* is slidably in contact with the plate 32*c*.

The friction member 32*i* is provided between the intermediate plate 32*g* and the plate 32*f*, and is fixed to the intermediate plate 32*g* by the rivet 32*j* (i.e., the rivet 32*j* provided in a circumferential direction). The friction member 32*i* is slidably in contact with the plate 32*f*.

The rivet 32*j* fixes the friction member 32*i* and/or the friction member 32*h* to the intermediate plate 32*g*.

The disc plate 32*k* is an annular plate member formed in a predetermined configuration. The disc plate 32*k* is in contact with the elastic member 34 at radially inner side portion (i.e., in the vicinity of an inner peripherally side portion) there of. The disc plate 32*k* includes a window portion formed at an intermediate portion thereof for housing the coil spring 5, the seat member 6, and the elastic member 7, and circumferentially end surfaces of the window portion are detachably in contact with the seat member 6. The disc plate 32*k* is slidably in contact with the third component member 33 at radially outward relative to the coil spring 5. The disc plate 32*k* is fixed by the rivet 32*m* together with the disc plate 32*l* and the intermediate plate 32*g* at radially outward relative to the third component member 33.

The disc plate 32*l* is an annular plate member formed in a predetermined configuration. The disc plate 32*l* restricts the friction member 32*p* not to move in a rotational direction and in a radial direction at inner peripheral end portion thereof, and includes a notch portion for allowing the friction member 32*p* to move in an axial direction. The disc plate 32*l* is in contact with an end of the coned disc spring 32*q* at radially inner side portion (i.e., in the vicinity of the inner peripheral portion) thereof. The disc plate 32*l* includes a window portion at the intermediate portion thereof for housing the coil spring 5, the seat member 6, and the elastic member 7, and end surfaces of the window portion are detachably in contact with the seat member 6. The disc plate 32*l* is slidably in contact with the friction member 32*n* at radially outward relative to the coil spring 5. The disc plate 32*l* is fixed by the rivet 32*m* together with the disc plate 32*k* and the intermediate plate 32*g* at radially outward relative to the friction member 32*n*.

The rivet 32*m* integrally fixes the disc plate 32*k*, the disc plate 32*l*, and the intermediate plate 32*g*.

The friction member 32*n* is provided between the disc plate 32*l* and the flange portion 31*a* of the first component member 31, and is detachably and slidably in contact with the disc plate 32*l* and the flange portion 31*a*. The friction member 32*n* is arranged to be separated from the disc plate 32*l* when the third component member 33 does not push the flange portion 31*a* to the friction member 32*n*.

The friction member 32*o* is provided between the elastic member 34 and the flange portion 31*a* of the first component member 31, and is slidably in contact with the elastic member 34 and the flange portion 31*a*. An inner peripheral portion of the friction member 32*o* extends in an axial direction to overlap with inner peripheral end portion of the elastic member 34 and the disc plate 32*k*.

The friction member 32*p* is provided between the coned disc spring 32*q* and the flange portion 31*a* of the first component member 31, and is biased towards the flange portion 31*a* by means of the coned disc spring 32*q* so as to be slidable with the flange portion 31*a*. An inner peripheral end portion of the friction member 32*p* extends in an axial direction towards the notch portion formed on the disc plate 32*l*, is restricted not to move in a rotational direction and in a radial direction by the notch portion of the disc plate 32*l*, and is movable in an axial direction.

The coned disc spring 32*q* is provided between the disc plate 32*l* and the friction member 32*p*, and biases the friction member 32*p* towards the flange portion 31*a* of the first component member 31.

The third component member 33 includes a friction member provided between two surfaces (i.e., surfaces of the disc plate 32*k* and the disc plate 32*l*) of the second component members 32. The third component member 33 is arranged radially outward relative to the coil spring 5, and is provided between the disc plate 32*k* of the second component member 32 and the flange portion 31*a* of the first component member 31. The third component member 33 includes a tapered surface 33*a* (See FIG. 10) at a surface facing the flange portion 31*a*. The tapered surface 33*a* faces a tapered surface 31*b* (See FIG. 10) of the flange portion 31*a*, is relatively movable to the tapered surface 31*b* in a circumferential direction having a predetermined play from each other, and is configured to be pushed towards the disc plate 32*k* in response to the relative speed and/or the relative acceleration upon a contact with the tapered surface 31*b*. The third component member 33 includes an extended portion 33*b* provided at radially inside thereof for receiving the biasing force of the elastic member 34, and is biased towards the disc plate 32*k* by the elastic member 34. The third component member 33 is slidably in contact with the disc plate 32*k*.

The elastic member 34 is a plate shaped spring in which a plate portion extends outwardly from a ring portion, and is sandwiched between the disc plate 32*k* of the second component member 32 and the friction member 32*o*. The elastic member 34 biases the extended portion 33*b* of the third component member 33 towards the disc plate 32*k*.

The coil spring 5 is housed in the window portion formed at the disc plates 32*k*, 32*l* and the flange portion 31*a* of the first component member 31, and is in contact with the seat member 6 which is provided at both ends thereof. The coil spring 5 is deflected when the disc plates 32*k*, 32*l* move relative to the flange potion 31*a* to absorb the shock generated by the rotational difference between the disc plates 32*k*, 32*l* and the flange portion 31*a*.

The seat member 6 is housed in the window portion formed at the disc plates 32*k*, 32*l*, and the flange portion 31*a* of the first component member 31, and is provided between the window portion and the end portions of the coil spring 5.

The elastic member 7 is provided at an inner periphery of the coil spring 5, and comes in contact with two seat member 6 opposing each other when the coil spring 5 is deflected to absorb the shock generated by the rotational difference between the disc plates 32*k*, 32*l* and the flange portion 31*a*

(i.e., the shock and sound caused when the disc plates 32k, 32l and the flange portion 31a are twisted relatively quickly).

According to the construction of the fourth embodiment, advantages identical to the first embodiment are attained.

Figure 11:
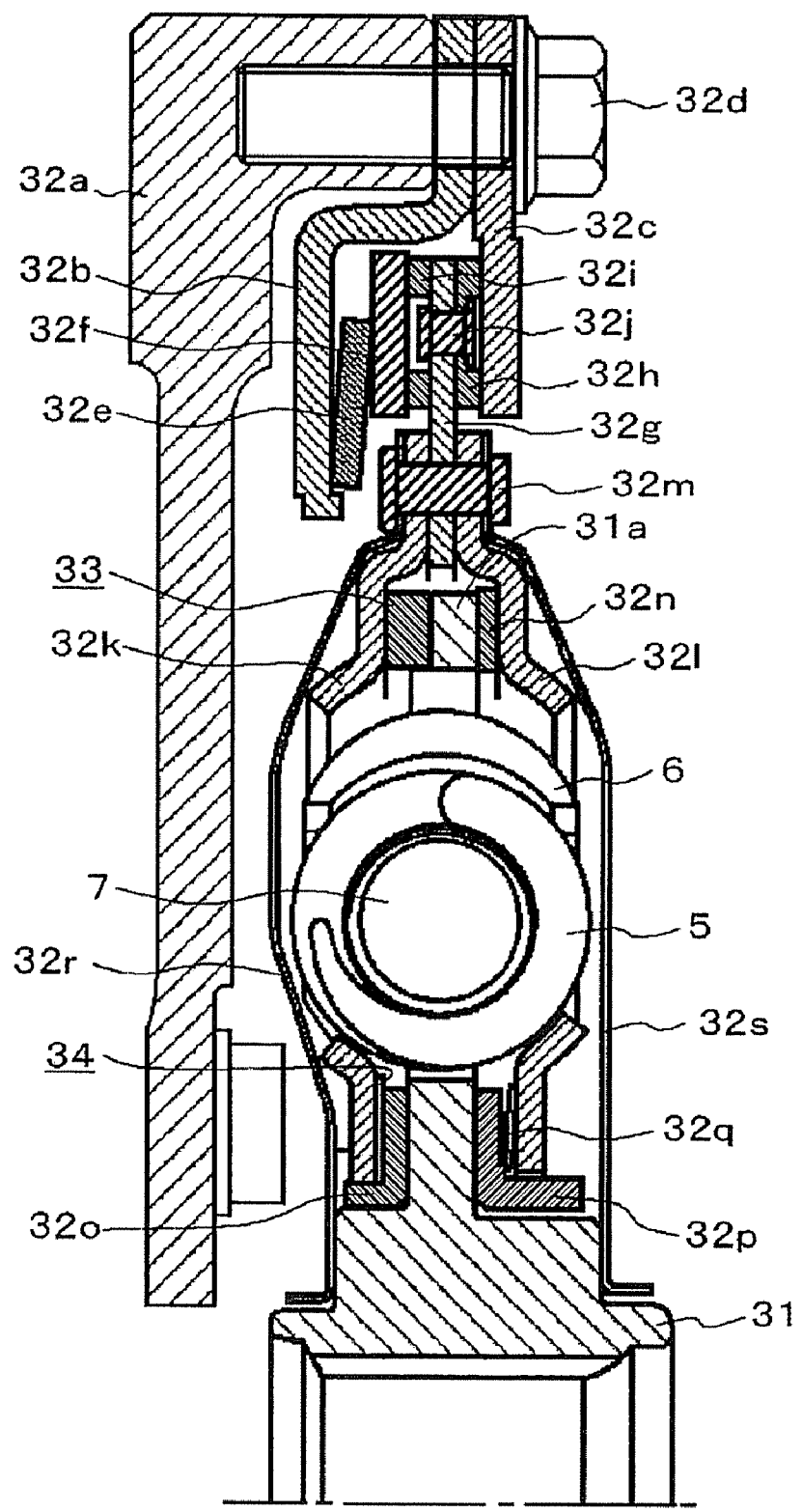
FIG. 11 is a partial cross-sectional view of a torque fluctuation absorbing apparatus according to a fifth embodiment of the present invention.

A fifth embodiment of a torque fluctuation absorbing apparatus will be explained with reference to FIG. 11 as follows.

The torque fluctuation absorbing apparatus according to the fifth embodiment, cover members 32r, 32s which cover the coil spring 5 are attached on axial both sides of a disc portion, and a variable hysteresis portion including at least the third component member 33 is filled with grease (i.e., lubrication fluid). The lubrication fluid may be provided at friction surfaces between the first component member 31, the second component member 32, and the third component member 33. The cover members 32r, 32s are fixed by the rivet 32m together with the disc plates 32k, 32l and the intermediate plate 32g at outer peripheral end portion (i.e., radially outside portion), and are in contact with respective surfaces of the first component member 31 in an axial direction at radially inner side portion (i.e., an inner peripheral portion) thereof. Other constructions are identical to the fourth embodiment, and explanations for the identical constructions will not be repeated.

According to the fifth embodiment, identical advantages to the first embodiment are attained. Further, according to the fifth embodiment, level of hysteresis at the variable hysteresis portion including the third component member 33 is increased by viscosity resistance of the grease.

Figure 12:
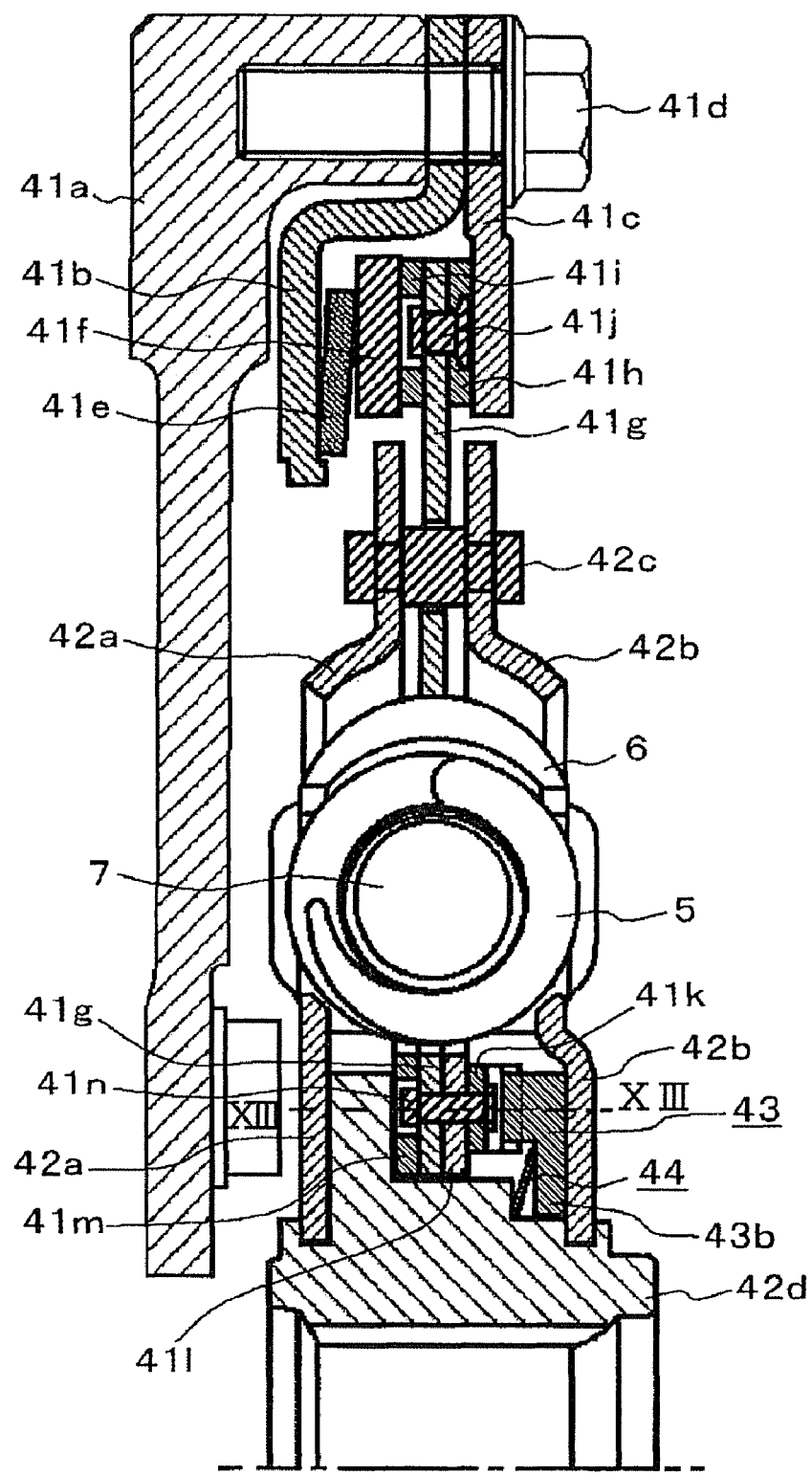
FIG. 12 is a partial cross-sectional view of a torque fluctuation absorbing apparatus according to a sixth embodiment of the present invention.
Figure 13:
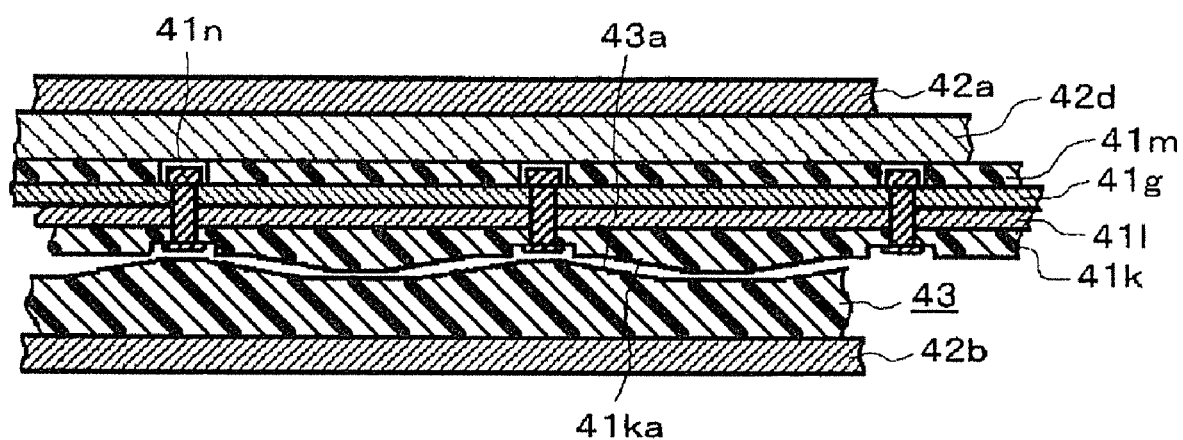
FIG. 13 is a partial cross-sectional view of the torque fluctuation absorbing apparatus taken on line XIII-XIII in FIG. 12 according to the sixth embodiment of the present invention.

A sixth embodiment of a torque fluctuation absorbing apparatus will be explained with reference to FIGS. 12-13 as follows.

The torque fluctuation apparatus according to the sixth embodiment is provided at an output shaft of an engine in a hybrid drive unit, and absorbs (restrains) fluctuation torque generated by the engine and an electric motor. The torque fluctuation absorbing apparatus having a torsional damping friction includes a first component member 41 (41a-41n), a second component member 42 (42a-42d), a third component member 43, an elastic member 44, the coil spring 5, the seat member 6, and the elastic member 7.

A portion of the first component member 41 is provided between two surfaces (i.e., surfaces of a disc plate 42b and a hub member 42d) of the second component member 42. The first component member 41 includes a rotational member 41a, plates 41b, 41c, a bolt 41d, coned disc spring 41e, a plate 41f, an intermediate plate 41g, friction members 41h, 41i, a rivet 41j, a friction member 41k, an auxiliary plate 41l, a friction member 41m, and a rivet 41n. Constructions of members other than the intermediate plate 41g, the friction member 41k, the auxiliary plate 41l, the friction member 41m, and the rivet 41n are identical to the constructions of the rotational member 21a, the plates 21b, 21c, the bolt 21d, the coned disc spring 21e, the plate 21f, the friction members 21h, 21i, and the rivet 21j of the third embodiment (See FIG. 7).

The intermediate plate 41g is a plate member provided between the disc plates 42a and the disc plate 42b and arranged being separate from the disc plate 42a and the disc plate 42b. The intermediate plate 41g is relatively movable to the disc plate 42a and the disc plate 42b. The auxiliary plate 41l and the friction member 41k are fixed on a surface of the intermediate plate 41g facing the disc plate 42b at inner peripheral portion (i.e., radially inner side portion) of the intermediate plate 41g. A surface of the intermediate plate 41g facing the hub member 42d is slidably in contact with the friction member 41m at a radially inner side portion (i.e., inner peripheral side portion) thereof. The intermediate plate 41g includes a window portion for housing the coil spring 5, the seat member 6, and the elastic member 7, and end surfaces of the window portion are detachably in contact with the seat member 6. The intermediate plate 41g is not fixed by a rivet 42c and includes a window portion which allows the rivet 42c to move in a rotational direction. The intermediate plate 41g extends so that radially outer portion thereof is provided between the plate 41c and the plate 41f, and the friction members 41h, 41i are fixed on respective surfaces of the intermediate plate 41g at radially outer side portion thereof by means of the rivet 41j.

The friction member 41k is a friction member which is provided between the auxiliary plate 41l and the third component member 43 and is fixed to the intermediate plate 41g together with the auxiliary plate 41l by means of the rivet 41n. The friction member 41k includes a tapered surface (i.e., serving as a second tapered surface) 41ka (See FIG. 13) on a surface facing the third component member 43. The tapered surface 41ka faces a tapered surface (i.e., serving as a first tapered surface) 43a (See FIG. 13) of the third component member 43, relatively moves to the tapered surface 43a in a circumferential direction having a predetermined play from each other, and is configured to push the third component member 43 towards the disc plate 42b in response to the relative speed and/or the relative acceleration upon a contact with the tapered surface 43a.

The auxiliary plate 41l is fixed to the intermediate plate 41g at a surface facing the disc plate 42b together with the friction member 41k by the rivet 41n. The auxiliary plate 41l includes a window portion for housing the coil spring 5, the seat member 6, and the elastic member 7, and end surfaces of the window portion is detachably in contact with the seat member 6.

The friction member 41m is provided between the intermediate plate 41g and the hub member 42d, and is slidably in contact with the hub member 42d. The friction member 41m includes a hole which houses a flange portion of the rivet 41n.

The rivet 41n fixes the auxiliary plate 41l and the friction member 41k to the intermediate plate 41g.

The second component member 42 includes two surfaces (i.e., surfaces of the disc plate 42b and the hub portion 42d) which are arranged spaced from each other. The second component member 42 includes the disc plates 42a, 42b, the rivet 42c, and the hub member 42d.

The disc plate 42a is an annular plate member formed in a predetermined configuration. The disc plate 42a is fixed to the hub member 42d at a radially inner portion (i.e., inner peripheral portion) thereof. The disc plate 42a includes a window portion at an intermediate portion thereof for housing the coil spring 5, the seat member 6, and the elastic member 7, and circumferentially end surfaces of the window portion are detachably in contact with the seat member 6. The disc plate 42a is fixed by the rivet 42c at radially outward side relative to the coil spring 5.

The disc plate 42b is an annular plate member shaped in a predetermined configuration. The disc plate 42b is fixed to the hub member 42d at a radially inner portion (i.e., inner peripheral portion) thereof. The disc plate 42b includes a window portion for housing the coil spring 5, the seat member 6, and the elastic member 7, and end surfaces of the window portion is detachably in contact with the seat member 6. The disc plate 42b is fixed by the rivet 42c at radially outward portion relative to the coil spring 5.

The rivet 42c integrally fixes the disc plate 42a and the disc plate 42b. The rivet 42c is fixed to the disc plate 42a by caulking at a portion facing the rotational member 41a. The rivet 42c is also fixed to the disc plate 42b by caulking at an opposite side from the rotational member 41a. The rivet 42c includes a larger diameter at an intermediate portion thereof, is not fixed to the intermediate plate 41g, and is movable within the window portion formed at the intermediate plate 41g.

The hub member 42d is engaged, for example, with a rotational shaft of an electric motor by a spline at an inner periphery (i.e., radially inner side) thereof, and fixes the disc plate 42a and the disc plate 42b at an outer periphery (i.e., radially outer side) thereof.

The third component member 43 includes a friction member provided between two surfaces (i.e., surfaces of the disc plate 42b and the hub member 42d) of the second component member 42. The third component member 43 is provided at radially inward (i.e., at inner peripheral side) relative to the coil spring 5, and is arranged between the disc plate 42b of the second component member 42 and the friction member 41k of the first component member 41. The third component member 43 includes a tapered surface 43a (see FIG. 13) formed at a surface thereof facing the friction member 41k. The tapered surface 43a faces a tapered surface 41ka (See FIG. 13) of the friction member 41k, is relatively movable to the tapered surface 41ka in a circumferential direction having a predetermined play from each other, and is configured to be pushed towards the disc plate 42b in response to the relative speed and/or the relative acceleration upon a contact with the tapered surface 41ka. The third component member 43 includes an extended portion 43b formed at radially inner side thereof for receiving a biasing force of the elastic member 44, and is biased towards the disc plate 42b by the elastic member 44. The third component member 43 is slidably in contact with the disc plate 42b.

The elastic member 44 is a ring shaped coned disc spring provided between the hub member 42d and the third component member 43 to bias the extended portion 43b of the third component member 43 towards the disc plate 42b.

The coil spring 5 is housed within the window portion formed at the disc plates 42a, 42b, the intermediate plate 41g, and the auxiliary plate 41l, and is in contact with the seat member 6 which is provided at both ends of the window portion in a circumferential direction. The coil spring 5 is deflected when the disc plates 42a, 42b and the intermediate plate 41g relatively move, and absorbs the shock (i.e., impact, noise) generated by rotational difference between the disc plates 42a, 42b and the intermediate plate 41g.

The seat member 6 is housed within the window portion formed at the disc plates 42a, 42b, and the intermediate plate 41g, and is arranged between the window portion and ends of the coil spring 5.

The elastic member 7 is provided at inner periphery of the coil spring 5, comes in contact with two seat members 6 provided facing each other when the coil spring 5 is deflected, and absorbs the shock (i.e., impact, noise) caused by the rotational difference between the disc plates 42a, 42b and the intermediate plate 41g.

According to the sixth embodiment, advantages identical to the first embodiment are attained.

Figure 14:
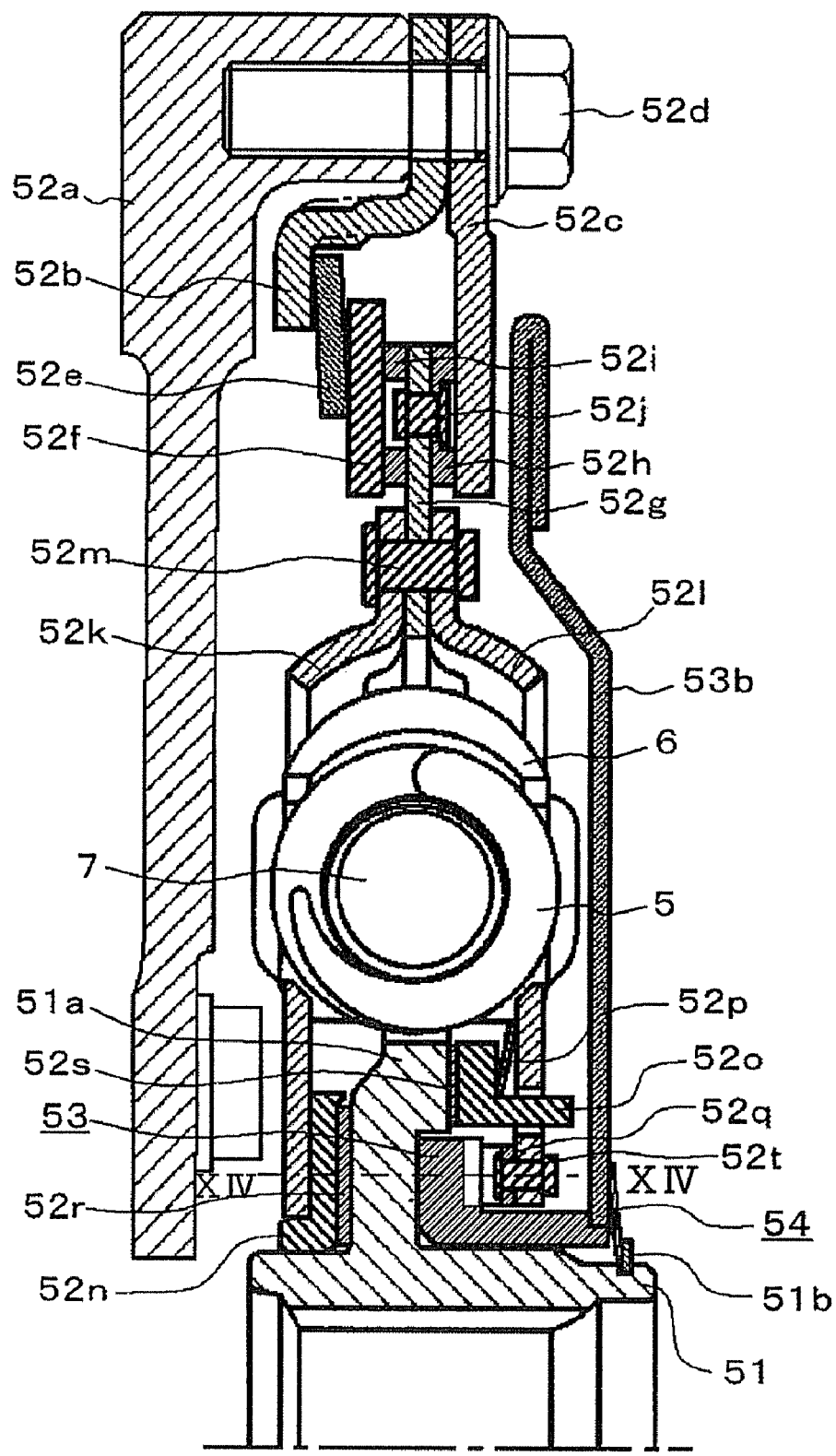
FIG. 14 is a partial cross-sectional view of a torque fluctuation absorbing apparatus according to a seventh embodiment of the present invention.
Figure 15:
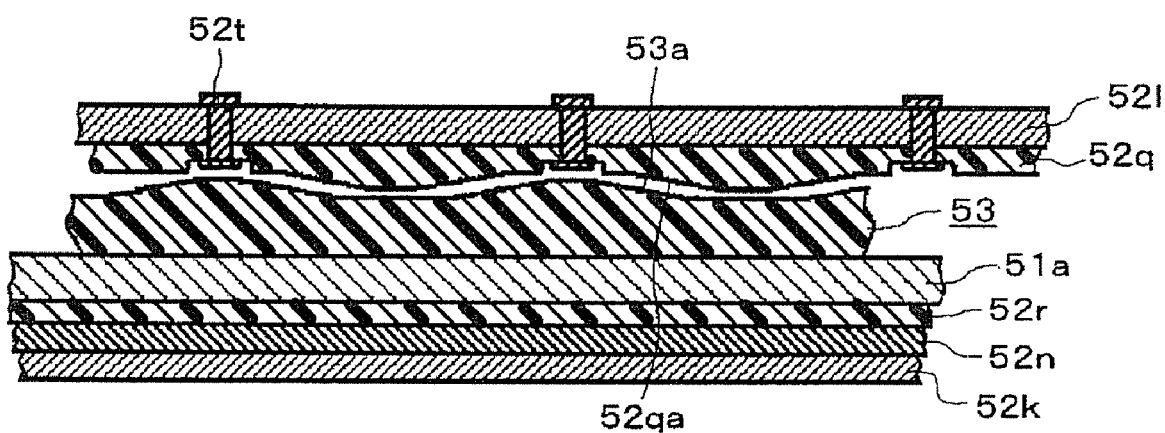
FIG. 15 is a partial cross-sectional view of the torque fluctuation absorbing apparatus taken on line XIV-XIV in FIG. 14 according to the seventh embodiment of the present invention.

A seventh embodiment of a torque fluctuation absorbing apparatus will be explained with reference to FIGS. 14-15.

The torque fluctuation absorbing apparatus according to the seventh embodiment, for example, is provided at an output shaft of an engine in a hybrid drive unit to absorbs (restrains) fluctuated torque generated by the engine and an electric motor. The torque fluctuation absorbing apparatus having a torsional damping friction includes a first component member 51, a second component member 52 (52a-52t), a third component member 53, an elastic member 54, the coil spring 5, the seat member 6, and the elastic member 7.

The first component member 51 is provided between two surfaces (i.e., surfaces of a disc plate 52k and a disc plate 52l) of the second component 52. The first component member 51 is a hub member and is engaged with, for example, a rotational shaft of the electric motor by a spline. The first component member 51 includes a flange portion 51a extended radially outward. The flange portion 51a includes a window portion at an intermediate portion thereof for housing the coil spring 5, the seat member 6, and the elastic member 7, and end surfaces in a circumferential direction of the window portion are detachably in contact with the seat member 6. A snap pin 51b is attached to an outer peripheral surface of the hub portion of the first component member 51 for supporting an end of the elastic member 54.

The second component member 52 includes two surfaces (surfaces of the disc plate 52k and the disc plate 52l) which are arranged having a distance from each other. The second component member 52 includes a rotational member 52a, plates 52b, 52c, a bolt 52d, a coned disc spring 52e, a plate 52f, an intermediate plate 52g, friction members 52h, 52i, a rivet 52j, disc plates 52k, 52l, a rivet 52m, plates 52n, 52o, a coned disc spring 52p, friction members 52q, 25r, 52s, and a rivet 52t. Constructions of members of the torque fluctuation absorbing apparatus, according to the seventh embodiment, other than the disc plates 52k, 52l, the rivet 52m, the plates 52n, 52o, the coned disc spring 52p, the friction members 52q, 52r, 52s, and the rivet 52t are identical to the rotational member 32a, the plates 32b, 32c, the bolt 32d, the coned disc spring 32e, the plate 32f, the intermediate plate 32g, the friction members 32h, 32i, and the rivet 32j of the fourth embodiment (See FIG. 9). Further, although configurations of the plate 52b and the coned disc spring 52e according to the seventh embodiment are different from the configurations of the plate 32b and the coned disc spring 32e of the fourth embodiment (See FIG. 9), frictions of the plate 52b and the coned disc spring 52e are identical to the frictions of the plate 32b and the coned disc spring 32e of the fourth embodiment.

The disc plate 52k is an annular plate member formed in a predetermined configuration. The disc plate 52k is slidably in contact with the plate 52n at radially inner portion (i.e., in the vicinity of the inner peripheral portion) thereof. The disc plate 52k includes a window portion at an intermediate portion thereof for housing the coil spring 5, the seat member 6, and the elastic member 7, and circumferentially end surfaces of the window portion are detachably in contact with the seat member 6. The disc plate 52k is fixed by the rivet 52m together with the disc plate 52l and the intermediate plate 52g at radially outward side relative to the coil spring 5.

The disc plate 52l is an annular plate member formed in a predetermined configuration. The friction member 52q is fixed to a surface of the disc plate 52l facing the disc plate 52k at radially inner side portion (i.e., inner peripheral portion) thereof by means of the rivet 52t. The disc plate 52l restricts the plate 52o not to move in a rotational direction and in a radial direction and includes a hole which allows the plate 52o to move in an axial direction. The disc plate 52l is in contact with an end of the coned disc spring 52p. The disc plate 52l includes a window portion at an intermediate portion thereof for housing the coil spring 5, the seat member 6, and the elastic member 7, and end surfaces of the window portion are detachably in contact with the seat member 6. The disc plate 52l is fixed by the rivet 52m together with the disc plate 52k and the intermediate plate 52g at radially outward side relative to the coil spring 5.

The rivet 52m fixes the disc plate 52k, the disc plate 52l, and the intermediate plate 52g integrally.

The plate 52n is provided between the disc plate 52k and the friction member 52r and is slidably in contact with the disc plate 52k and the friction member 52r. The plate 52n extends in an axial direction to an inner peripheral end portion of the disc plate 52k.

The plate 52o is provided between the coned disc spring 52p and the friction member 52s and is biased towards the friction member 52s by the coned disc spring 52p so as to be slidably in contact with the friction member 52s.

The coned disc spring 52p is provided between the plate 52o and the disc plate 52l to bias the plate 52o to the friction member 52s.

The friction member 52q is provided between the disc plate 52l and the third component member 53 and is fixed to the disc plate 52l by means of the rivet 52t. The friction member 52q includes a tapered surface (i.e., serving as a second tapered surface) 52qa (see FIG. 15) on a surface facing the third component member 53. The tapered surface 52qa faces a tapered surface (i.e., serving as a first tapered surface) 53a (See FIG. 15) of the third component member 53, is movable relative to the tapered surface 53a in a circumferential direction having a predetermined play from each other, and is configured to push the third component member 53 to the flange portion 51a in response to the relative speed and/or the relative acceleration upon a contact to the tapered surface 53a.

The Friction member 52r is provided between the plate 52n and the flange portion 51a, and is slidably in contact with the plate 52n and the flange portion 51a.

The friction member 52s is provided between the plate 52o and the flange portion 51a, and is constantly slidably in contact with the plate 52o and the flange portion 51a.

The rivet 52t fixes the friction member 52q to the disc plate 52l.

The third component member 53 includes a friction member provided between two surfaces (i.e., surfaces of the disc plate 52k and the disc plate 52l) of the second component member 52. The third component member 53 is provided radially inner (i.e., inner peripheral side) relative to the coil spring 53, between the friction member 52q of the second component member 52 and the flange portion 51a of the first component member 51. The third component member 53 includes the tapered surface 53a formed on the surface facing the friction member 52q. The tapered surface 53a faces the tapered surface 52qa of the friction member 52q, is movable relative to the tapered surface 52qa having a predetermined play from each other in a circumferential direction, and is configured to be pushed toward the flange portion 51a in response to the relative speed and/or the relative acceleration upon a contact to the tapered surface 52qa. An axially extended portion of the third component member 53 extends through between the first component member 51 and inner peripheral end portions of the friction member 52q and the disc plate 25l, and an inertia portion 53b is fixed to a tip end portion of the third component member 53. The inertia portion 53b extends radially outward from a fixed portion with the third component member 53 to weight the third component member 53. The inertia portion 53b is biased to the flange portion 51a by the elastic member 54 to push the third component member 53 to the flange portion 51a. The third component member 53 is constantly slidably in contact with the flange portion 51a.

The elastic member 54 is a ring shaped coned disc spring, and is provided between the snap pin 51b fixed to the first component member 51 and the inertia portion 53b of the third component member 53 to bias the third component member 53 towards the flange portion 51a via the inertia portion 53b.

Constructions of the coil spring 5, the seat member 6, and the elastic member 7 are identical to the constructions of the fourth embodiment.

According to the construction of the seventh embodiment, advantages identical to the first embodiment are attained.

Figure 16:
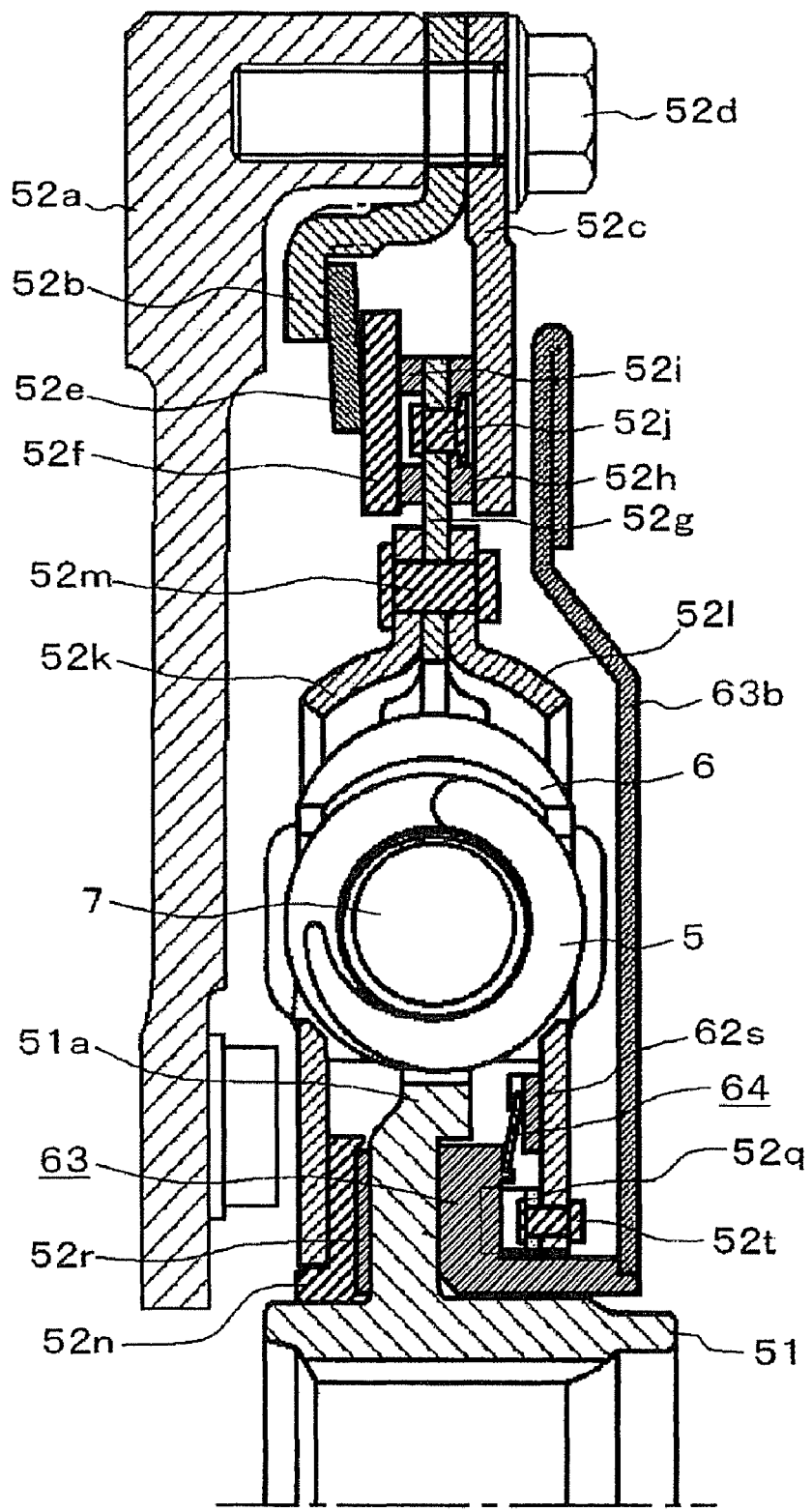
FIG. 16 is a partial cross-sectional view of a torque fluctuation absorbing apparatus according to an eighth embodiment of the present invention.

An eighth embodiment of a torque fluctuation absorbing apparatus will be explained with reference to FIG. 16.

With the torque fluctuation absorbing apparatus according to the eighth embodiment, the snap pin 51b, the plate 52o, the friction member 52s, and the coned disc spring 52p of the seventh embodiment (See FIG. 14) are not adopted, the third component 53 and the elastic member 54 of the seventh embodiment are replaced by a third component 63 and an elastic member 64 according to the eighth embodiment (See FIG. 16), and a friction member 62s is additionally provided. Other constructions of the eighth embodiment are identical to the constructions of the seventh embodiment, and explanations for common constructions to the seventh embodiment will be repeated.

The friction member 62s is provided between the disc plate 52l and the elastic member 64 and is biased towards the disc plate 52l by means of the elastic member 64 so as to be constantly slidably in contact with the disc plate 52l. Coefficient of friction of the friction member 62s is less than coefficient of friction of the friction member applied to the third component member 63.

The third component member 63 includes a friction member provided between two surfaces (i.e., surfaces of the disc plate 52k and the disc plate 52l) of the second component member 52. The third component member 63 is provided radially inward (i.e., at inner peripheral side) relative to the coil spring 5, between the friction member 52q of the second component member 52 and the flange portion 51a of the first component member 51. The third component member 63 includes a tapered surface (i.e., identical to the tapered surface 53a in FIG. 15) on a surface facing the friction member 52q. The tapered surface of the third component member 63 faces the tapered surface 52qa (See FIG. 15) of the friction member 52q, is movable relative to the tapered surface 52qa having a predetermined play from each other in a circumferential direction, and is configured to be pushed towards the flange portion 51a in response to the relative speed and/or the relative acceleration upon a contact to the tapered surface 52qa. An axially extended portion of the third component member 63 extends through between the first component member 51 and inner peripheral end portions of the friction member 52q and the disc plate 52l, and an inertia portion 63b is fixed to a tip end portion of the third component member 63. The inertia portion 63b extends radially outward from a fixed portion with the third component member 63 to weight the component member 63. The third component member 63 is constantly slidably in contact with the flange portion 51a.

The elastic member 64 is a ring shaped coned disc spring which is provided between the friction member 62s and the third component member 63 to bias the third component member 63 towards the flange portion 51a and also to bias the friction member 62s towards the disc plate 52l. The elastic member 64 includes a friction as the coned disc spring 52p and the elastic member 54 of the seventh embodiment (See FIG. 14).

According to the eighth embodiment of the present invention, advantages identical to the first embodiment are attained.

According to the subject matter of the torque fluctuation absorbing apparatus, the pressing generating mechanism 3a, 23a, 33a, 43a, 53a, 2ka, 21la, 31b, 41ka, 52qa includes a first tapered surface 3a, 23a, 33a, 43a, 53a formed on the third component member and a second tapered surface 2*ka*, 21*la*, 31*b*, 41*ka*, 52*qa* formed on either one of the first component member 1, 21, 31, 41, 51 and the second component member 2, 22, 32, 42, 52 and facing the first tapered surface 3*a*, 23*a*, 33*a*, 43*a*, 53*a*.

According to the subject matter of the torque fluctuation absorbing apparatus, the elastic member 24 biases the third component member 23 in a direction to contact the second component member 22, the third component member 23 is constantly in contact with the second component member 22 and is movable relative to the first component member 2 having a predetermined play in a circumferential direction, and the pressing generating mechanism 23*a*, 21*la* generates pressing force when the third component member 23 and the first component member 21 relatively move each other in the circumferential direction.

According to the subject matter of the torque fluctuation absorbing apparatus, coefficient of friction between the first component member 1 and the second component member 2 is less than coefficient of friction between the third component member 3 and the second component member 2.

According to the subject matter of the torque fluctuation absorbing apparatus, the elastic member 4 biases the third component member 3 in a direction to contact the first component member 1, the third component member 3 is constantly in contact with the first component member 1 and is relatively movable to the second component member 2 having a predetermined play in the circumferential direction, and the pressing generating mechanism 23*a*, 21*la* generates pressing force when the third component member 3 and the second component member 2 relatively move each other in the circumferential direction.

According to the subject matter of the torque fluctuation absorbing apparatus, coefficient of friction between the first component member 51 and the second component member 52 is less than coefficient of friction between the third component member 63 and the first component member 51.

According to the subject matter of the torque fluctuation absorbing apparatus, the elastic member 24 is supported by the second component member 22.

According to the subject matter of the torque fluctuation absorbing apparatus, the elastic member 4 is supported by the first component member 1.

According to the subject matter of the torque fluctuation absorbing apparatus, a first end of the elastic member 64 is in contact with the third component member 63.

According to the subject matter of the torque fluctuation absorbing apparatus, the elastic member 64 is provided with a friction member 62*s* at a second end thereof.

According to the subject matter of the torque fluctuation absorbing apparatus, lubrication fluid is provided at friction surfaces between the first component member 31, the second component member 32, and the third component member 33.

According to subject matter of the torque fluctuation absorbing apparatus, by applying pre-load to the third component member 3, 23, 33, 43, 53, 63 in a direction to push a sliding surface or in a vertical direction relative to the sliding surface, adequate frictional torque is generated even with a small working diameter thereof. Further, slapping sound caused by the saccadic movement of the third component member 3, 23, 33, 43, 53, 63 is prevented. Because the load in an axial direction is generated immediately after the third component member 3, 23, 33, 43, 53, 63 and either the first component member 1, 21, 31, 41, 51 or the second component member 2, 22, 32, 42, 52 contact each other (i.e., immediately after the tapered surface 3*a*, 23*a*, 33*a*, 43*a*, 53*a* of the third component member 3, 23, 33, 43, 53, 63 and the tapered surface 2*ka*, 21*la*, 31*b*, 41*ka*, 52*qa* of the first component member 1, 21, 31, 41, 51 or the second component member 2, 22, 32, 42, 52 contact each other), hysteresis starts to work quickly. Further, by combining the elastic member 4, 24, 34, 44, 54, 64 which generates pressing force to the extent which does not provide negative influence when the first component member and the second component member move slightly to the mechanism which generates the pressing force by pushing a frictional surface to an inclined surface, or the like, which serves as a hysteresis construction, to make an initial value for the generation of hysteresis be variable, a tuning range of the vehicle is broaden. (With the known structure in which hysteresis is varied based on changes of amplitude, in case a large hysteresis construction is provided to improve a damping when the first component member and the second component member move greatly, damping performance when the first component member and the second component member move slightly may be influenced and/or slapping sound may be generated when generating large degree of hysteresis.)

According to the subject matter of the torque fluctuation absorbing apparatus, the generation of the hysteresis when the first component member 1, 21 and the second component member 2, 22 move slightly and the application of the pressure to the third component member 3, 23 are performed by a single elastic member.

According to the subject matter of the torque fluctuation absorbing apparatus, a value of hysteresis when the first component member 1, 51 and the second component member 2, 52 move slightly can be reduced. Further, generations of the interference hysteresis can be prevented.

According to the subject matter of the torque fluctuation absorbing apparatus, abrasions of the members can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus, comprising:
a first component member;
a second component member being movable relative to the first component member;
a third component member movable relative to the first component member and the second component member in a circumferential direction;
an elastic member biasing the third component member in a direction to contact either one of the first component member and the second component member so as to contact the third component member with either one of the first component member and the second component member; and
a pressing generating mechanism provided at the third component member and the other of the first component member and the second component member for generating pressing force in an identical direction to the direction of the biasing force by the elastic member in response to relative speed and/or relative acceleration when the first component member moves relative to the second component member in the circumferential direction, wherein, when the relative speed and/or relative acceleration between the first component member and the second component member is smaller than a predetermined speed and/or acceleration, the pressing force is smaller than a predetermined force due to restriction of the relative rotation between the third component member and the other one of the first component member and the second component member.

2. The torque fluctuation absorbing apparatus, according to claim 1 wherein the pressing generating mechanism includes a first tapered surface formed on the third component member and a second tapered surface formed on either one of the first component member and the second component member and facing the first tapered surface.

3. The torque fluctuation component member according to claim 2, wherein the elastic member biases the third component member in a direction to contact the first component member;

the third component member is constantly in contact with the first component member and is relatively movable to the second component member having a predetermined play between the first tapered surface and the second tapered surface in a circumferential direction; and the pressing generating mechanism generates pressing force when the third component member and the second component member relatively move each other in the circumferential direction.

4. The torque fluctuation absorbing apparatus according to claim 3, wherein coefficient of friction between the first component member and the second component member is less than coefficient of friction between the third component member and the second component member.

5. The torque fluctuation absorbing apparatus according to claim 2, wherein a coil spring is disposed between the first component member and the second component member for absorbing torque fluctuation between the first component member and the second component member, and the third component member is disposed at the outer radial side of the coil spring.

6. The torque fluctuation absorbing apparatus, according to claim 1, wherein the elastic member biases the third component member in a direction to contact the second component member;

the third component member is constantly in contact with the second component member and is movable relative to the first component member having a predetermined play in a circumferential direction; and wherein the pressing generating mechanism generates pressing force when the third component member and the first component member relatively move each other in the circumferential direction.

7. The torque fluctuation absorbing apparatus according to claim 6, wherein coefficient of friction between the first component member and the second component member is less than coefficient of friction between the third component member and the second component member.

8. The torque fluctuation absorbing apparatus according to claim 1, wherein lubrication fluid is provided at friction surfaces between the first component member, the second component member, and the third component member.

9. A torque fluctuation absorbing apparatus, comprising:

a first component member provided between two surfaces;

a second component member being movable relative to the first component member in a circumferential direction and having said two surfaces arranged spaced from each other;

a third component member arranged between said two surfaces and being movable relative to the first component member and the second component member having a predetermined play in a circumferential direction;

an elastic member biasing the third component member in a direction to contact said one of the first component member and the second component member so as to contact the third component member with the one of the first component member and the second component member; and a pressing generating mechanism provided at the third component member for generating pressing force in an identical direction to the direction of the biasing force by the elastic member in response to relative speed and/or relative acceleration when the first component member moves relative to the second component member in the circumferential direction, wherein, when the relative speed and/or relative acceleration between the first component member and the second component member is smaller than a predetermined speed and/or acceleration, the pressing force is smaller than a predetermined force due to restriction of the relative rotation between the third component member and the other one of the first component member and the second component member.

10. The torque fluctuation absorbing apparatus according to claim 9, wherein the elastic member is supported by the second component member.

11. The torque fluctuation absorbing apparatus according to claim 10, wherein a first end of the elastic member is in contact with the third component member.

12. The torque fluctuation absorbing apparatus according to claim 11, wherein the elastic member is provided with a friction member at a second end thereof.

13. The torque fluctuation absorbing apparatus according to claim 9, wherein the elastic member is supported by the first component member.

14. The torque fluctuation absorbing apparatus, according to claim 9 wherein the pressing generating mechanism includes a first tapered surface formed on the third component member and a second tapered surface formed on either one of the first component member and the second component member and facing the first tapered surface.

15. The torque fluctuation component member according to claim 14, wherein the elastic member biases the third component member in a direction to contact the first component member;

the third component member is constantly in contact with the first component member and is relatively movable to the second component member having a predetermined play between the first tapered surface and the second tapered surface in a circumferential direction; and the pressing generating mechanism generates pressing force when the third component member and the second component member relatively move each other in the circumferential direction.

16. The torque fluctuation absorbing apparatus according to claim 14, wherein a coil spring is disposed between the first component member and the second component member for absorbing torque fluctuation between the first component member and the second component member, and the third component member is disposed at the outer radial side of the coil spring.

17. The torque fluctuation absorbing apparatus, according to claim 9, wherein the elastic member biases the third component member in a direction to contact the second component member;

the third component member is constantly in contact with the second component member and is movable relative to the first component member having a predetermined play in a circumferential direction; and wherein the pressing generating mechanism generates pressing force when the third component member and the first component member relatively move each other in the circumferential direction.

18. The torque fluctuation absorbing apparatus according to claim 9, wherein lubrication fluid is provided at friction surfaces between the first component member, the second component member, and the third component member.

19. A torque fluctuation absorbing apparatus, comprising:
a first component member;
a second component member being movable relative to the first component member in a circumferential direction, and;
a third component member being movable relative to both of the first component member and the second component member;
an elastic member biasing the third component member in a direction to contact either one of the first component member and the second component member; and a pressing generating mechanism for generating pressing force in an identical direction to the direction of the biasing force by the elastic member when the third component member moves relative to either one of the first component member and the second component member, wherein the pressing generating mechanism includes a first tapered surface formed on the third component member and a second tapered surface formed on either one of the first component member and the second component member and facing the first tapered surface, and, when the relative speed and/or relative acceleration between the first component member and the second component member is smaller than a predetermined speed and/or acceleration, the pressing force is smaller than a predetermined force due to restriction of the relative rotation between the third component member and the other one of the first component member and the second component member.

20. The torque fluctuation absorbing apparatus according to claim 19, wherein a coil spring is disposed between the first component member and the second component member for absorbing torque fluctuation between the first component member and the second component member, and the third component member is disposed at the outer radial side of the coil spring.

* * * * *